(12) United States Patent
Tanaka et al.

(10) Patent No.: US 9,416,477 B2
(45) Date of Patent: Aug. 16, 2016

(54) CONTROL METHOD FOR WASHING MACHINE, WASHING MACHINE

(71) Applicant: Panasonic Intellectual Property Management Co., Ltd., Osaka (JP)

(72) Inventors: Toshiaki Tanaka, Kyoto (JP); Nozomu Tooyama, Osaka (JP); Masaru Yamaoka, Osaka (JP); Kazuhiro Kuroyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/668,592

(22) Filed: Mar. 25, 2015

(65) Prior Publication Data

US 2015/0275414 A1 Oct. 1, 2015

(30) Foreign Application Priority Data

Apr. 1, 2014 (JP) ................... 2014-075830

(51) Int. Cl.
*D06F 33/02* (2006.01)
*H04M 1/725* (2006.01)
*H04L 12/28* (2006.01)
*D06F 39/00* (2006.01)

(52) U.S. Cl.
CPC ............. *D06F 33/02* (2013.01); *D06F 39/002* (2013.01); *D06F 39/005* (2013.01); *H04L 12/2827* (2013.01); *D06F 2202/12* (2013.01); *D06F 2204/10* (2013.01); *H04L 2012/285* (2013.01); *H04L 2012/2841* (2013.01); *H04M 1/72533* (2013.01); *H04M 2250/12* (2013.01)

(58) Field of Classification Search
CPC ... D06F 33/02; D06F 39/005; D06F 2202/12; D06F 2204/10; D06F 2210/00; D06F 39/002; H04L 12/2827; H04M 1/7253; H04M 1/72533; H04M 2250/04
See application file for complete search history.

(56) References Cited

U.S. PATENT DOCUMENTS 9,161,310 B2 * 10/2015 Bahl ................. H04W 52/0254
2011/0156899 A1 * 6/2011 Lauer ................... D06F 39/002
340/539.11

FOREIGN PATENT DOCUMENTS

JP     2004-351124     12/2004

* cited by examiner

*Primary Examiner* — Fanghwa Wang
(74) *Attorney, Agent, or Firm* — Greenblum & Bernstein, P.L.C.

(57) ABSTRACT

A control method for a washing machine including a wireless communication unit for communicating with an electronic device includes: causing the washing machine to operate a washing tub of the washing machine as a preliminary operation; acquiring motion information regarding a motion of the electronic device during the preliminary operation; determining whether or not the electronic device is inside the washing tub based on the acquired motion information and information indicating the preliminary operation; and giving the washing machine a notification indicating that the electronic device is inside the washing tub if the determining step determines that the electronic device is inside the washing tub.

13 Claims, 17 Drawing Sheets

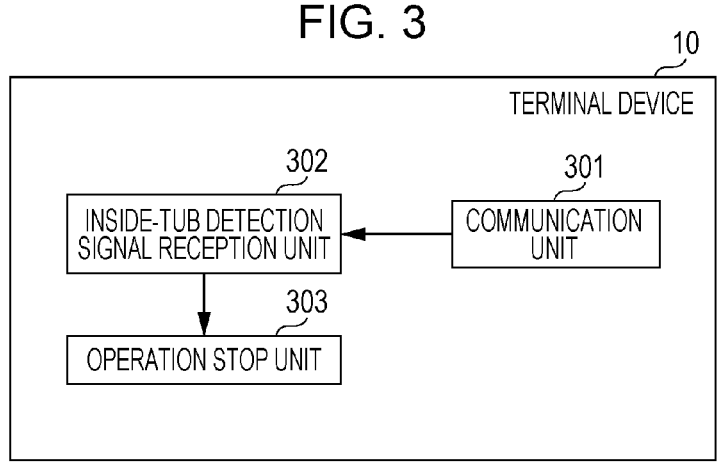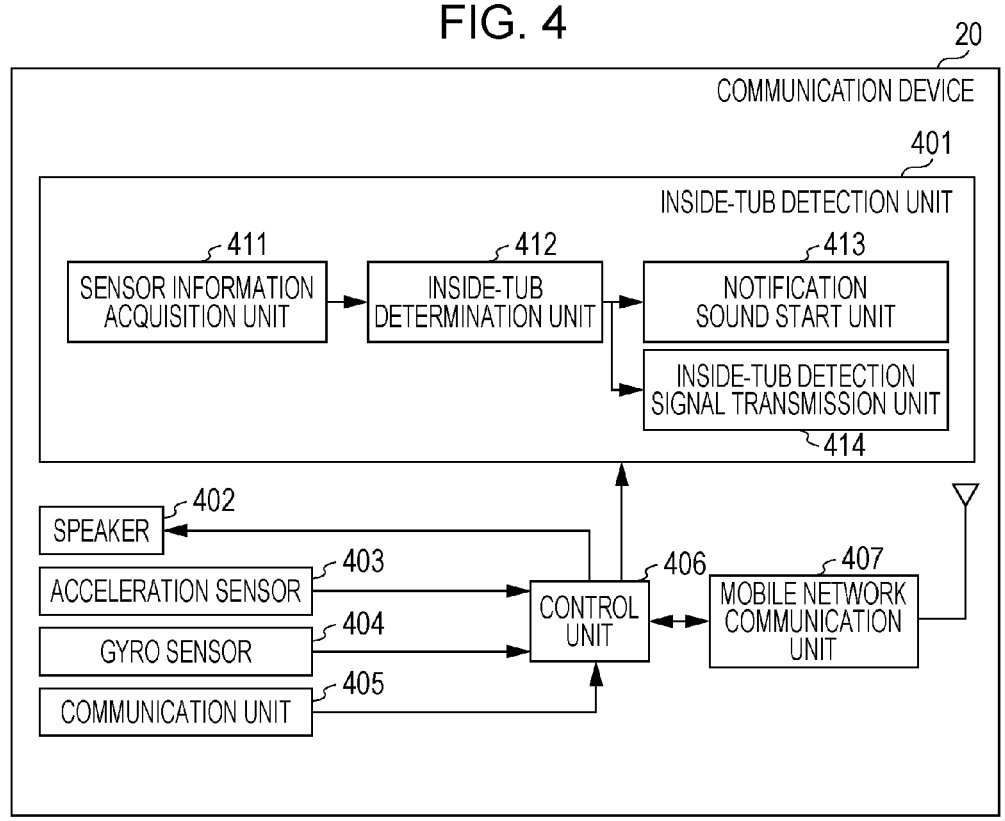

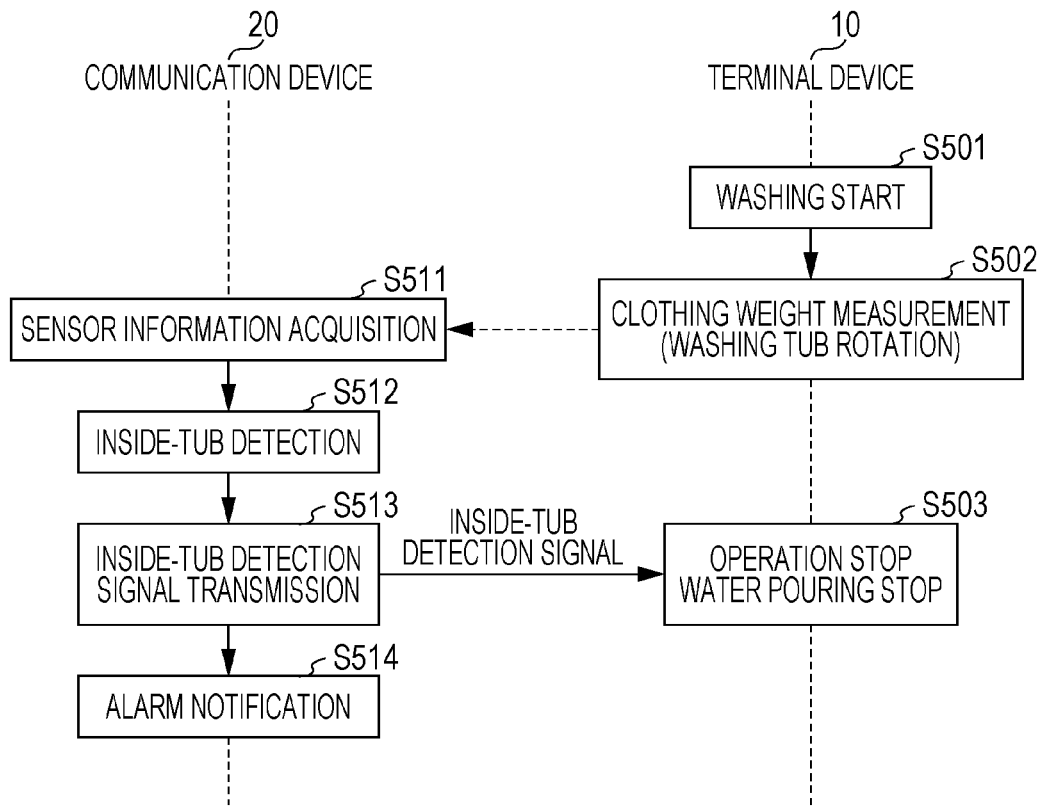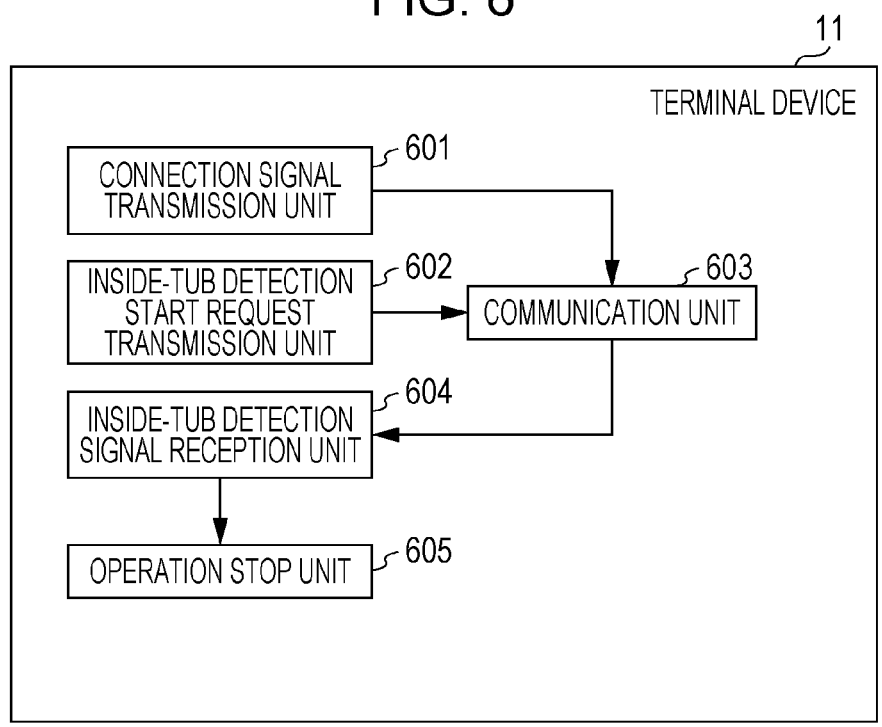

FIG. 12

| MODEL | OPERATION INFORMATION |
|---|---|
| ITEM NUMBER A | GYRO SENSOR: a1, a2<br>ACCELERATION SENSOR: b1, b2 |
| ITEM NUMBER B | GYRO SENSOR: c1, c2<br>ACCELERATION SENSOR: d1, d2 |
| ... | ... |

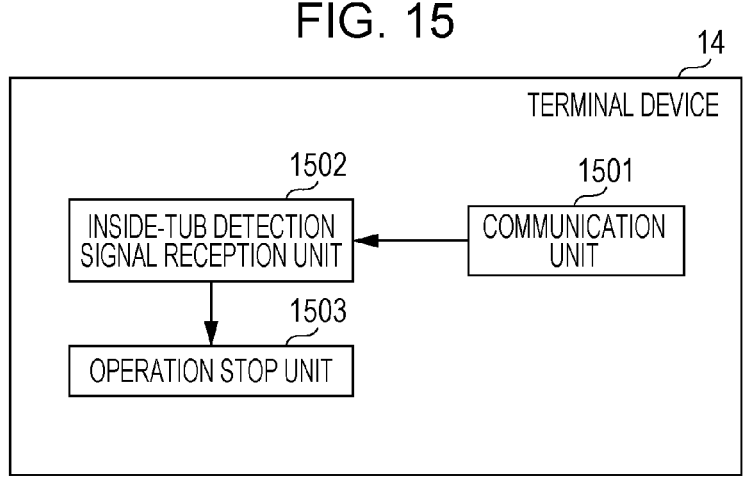
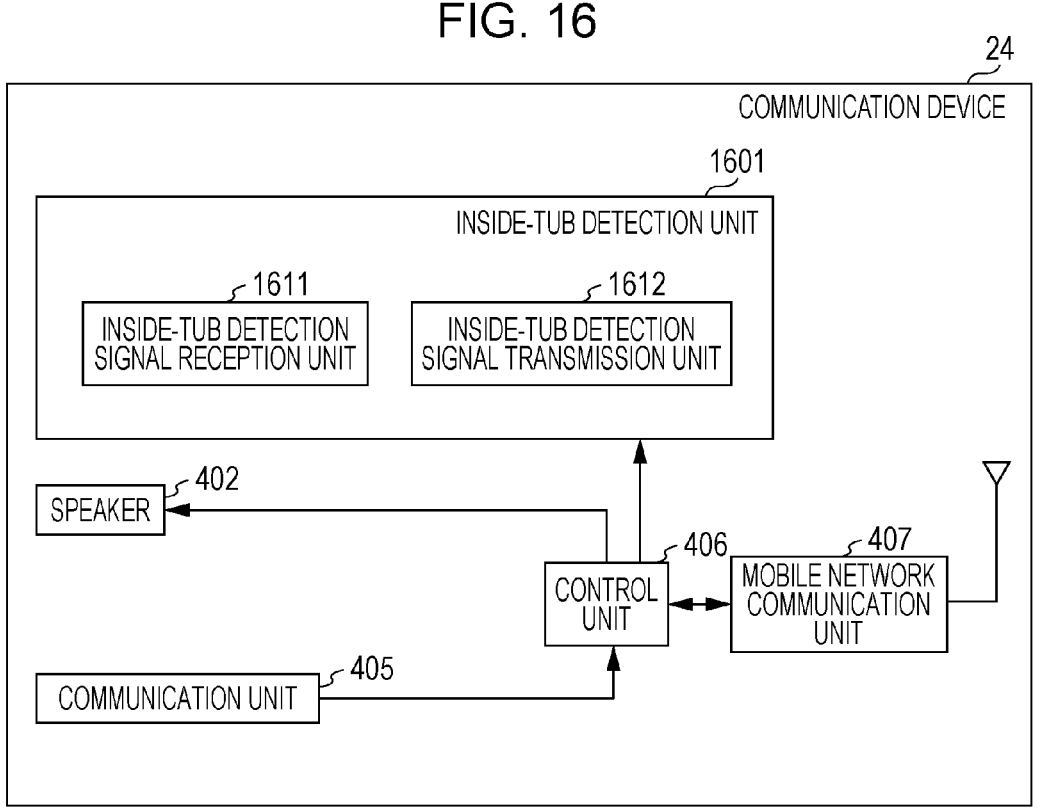

CONTROL METHOD FOR WASHING MACHINE, WASHING MACHINE

BACKGROUND

1. Technical Field

The present disclosure relates to a control method for a washing machine, a washing machine.

2. Description of the Related Art

A method has been disclosed for, in a washing machine, preventing damage to an electronic device left in clothing, by detecting the electronic device inside a water tub of the washing machine and notifying before water is poured. In this technique, the washing machine is connected to a fixed telephone line and makes a call to a mobile phone when a washing start time is reached (for example, see Japanese Unexamined Patent Application Publication No. 2004-351124).

SUMMARY

However, in the configuration disclosed in Japanese Unexamined Patent Application Publication No. 2004-351124, a call is always made to the electronic device from the fixed telephone line at the washing start time. Therefore, there is a problem in that unnecessary calls are made when there is no electronic device in the washing tub.

One non-limiting and exemplary embodiment provides a control method for a washing machine that avoids an electronic device being damaged inside a washing tub while also suppressing unnecessary calls.

In one general aspect, the techniques disclosed here feature a control method for a washing machine includes: causing the washing machine including a communication unit for communicating with an electronic device by wireless communication, to operate a washing tub of the washing machine as a preliminary operation; acquiring motion information regarding a motion of the electronic device during the preliminary operation; determining whether or not the electronic device is inside the washing tub based on the acquired motion information and information indicating the preliminary operation; and giving the washing machine a notification indicating that the electronic device is inside the washing tub if the determining step determines that the electronic device is inside the washing tub.

It should be noted that these comprehensive or specific aspects may be realized by a system, a method, an integrated circuit, a computer program, or a recording medium such as a computer-readable CD-ROM, and may be realized by an arbitrary combination of a system, a method, an integrated circuit, a computer program, and a recording medium.

As a result of the control method for a washing machine of the present disclosure, it is possible to avoid an electronic device being damaged inside a washing tub while also suppressing unnecessary calls.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a configuration diagram of function blocks of a terminal device in embodiment 1;

FIG. 4 is a configuration diagram of function blocks of a communication device in embodiment 1;

FIG. 5 is a sequence diagram of the control system in embodiment 1;

FIG. 6 is a configuration diagram of function blocks of a terminal device in embodiment 2;

FIG. 12 is an illustrative diagram of operation information of a terminal device in embodiment 3;

FIG. 15 is a configuration diagram of function blocks of a terminal device in embodiment 4;

FIG. 16 is a configuration diagram of function blocks of a communication device in embodiment 4;

Figure 1:
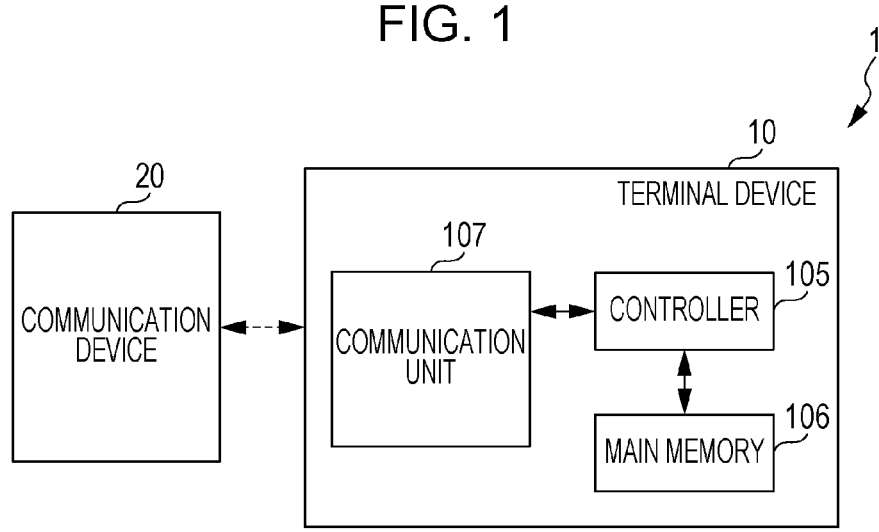
FIG. 1 is an illustrative diagram depicting the configuration of a control system in embodiment 1.

DETAILED DESCRIPTION (Underlying Knowledge Forming Basis of the Present Disclosure)

The present inventor found that the following problem occurs with regard to the control method for a washing machine described in the "Description of the Related Art" section.

Japanese Unexamined Patent Application Publication No. 2004-351124 discloses a technique with which a washing machine issues a warning when a mobile communication terminal has been put inside a washing tub. In other words, if a washing start button of an operation unit is pressed or a washing start time set by a timer is reached when the user has put clothing having a mobile communication terminal inside a pocket into a water tub, a CPU of a computer makes a call from a fixed telephone device connected to the washing machine, to a preregistered mobile communication terminal telephone number. The mobile communication terminal transmits a prescribed signal wave in accordance with this call, and also issues a warning by a warning sound or warning message from a warning unit. In addition, when this signal wave is detected by a sensor inside the water tub, the CPU prohibits the pouring of water into the water tub from a water pouring port, and also issues a warning sound or a warning message. Thereafter, when the user has removed the mobile communication terminal from the water tub and also canceled the warning, detection is once again carried out for a signal wave inside the water tub, and a washing program is caused to operate if a signal wave is not detected.

However, in the configuration disclosed in Japanese Unexamined Patent Application Publication No. 2004-351124, a call is always made to the electronic device from the fixed telephone line at the washing start time. Therefore, there is a problem in that unnecessary calls are made when there is no electronic device in the washing tub, and needless calls are received by the user.

Therefore, the present disclosure provides a control method for a washing machine that avoids an electronic device being damaged inside a washing tub while also suppressing unnecessary calls. Specifically, in the control method for a washing machine according to the present disclosure, a wireless communication function and various sensors such as motion sensors of an electronic device are used to detect that the electronic device is inside a washing tub, and, for example, a warning is issued to the user and washing is stopped.

In order to solve such a problem, a control method for a washing machine according to an aspect of the present disclosure is a control method for a washing machine includes: causing the washing machine, including a communication unit for communicating with an electronic device by wireless communication, to operate a washing tub of the washing machine as a preliminary operation; acquiring motion information regarding a motion of the electronic device during the preliminary operation; determining whether or not the electronic device is inside the washing tub based on the acquired motion information and information indicating the preliminary operation; and giving the washing machine a notification indicating that the electronic device is inside the washing tub if the determining step determines that the electronic device is inside the washing tub.

Accordingly, a control system for the washing machine (hereinafter, also referred to simply as a control system) uses the motion information obtained from sensor information of the electronic device, to determine whether or not the electronic device is inside the washing tub. If it is detected that the electronic device is inside the washing tub, control is carried out in such a way that notification is performed by transmitting an alarm notification or a washing machine stop signal to the washing machine to thereby prohibit the main operation by the washing machine. Here, because the motion information of the electronic device is used, it is possible to correctly determine that the electronic device is inside the washing tub, based on the motion of the electronic device inside the washing tub. Thus, it is possible for the control system to avoid the electronic device being damaged inside the washing tub while also suppressing unnecessary calls.

For example, the control method for a washing machine according to claim 1, further includes: prohibiting the washing machine to perform a main operation that is subsequent to the preliminary operation if the determining step determines that the electronic device is inside the washing tub; and allowing the washing machine to perform the main operation if the determining step determines that the electronic device is not inside the washing tub.

Accordingly, the control system uses motion information obtained from sensor information of the electronic device, to prohibit the main operation by the washing machine if the electronic device is inside the washing tub. Thus, the control system can more reliably avoid the electronic device being damaged inside the washing tub.

For example, the preliminary operation includes a rotational operation that causes the washing tub to rotate, the electronic device is provided with a sensor that detects the rotational motion of the electronic device, and, in the control method for a washing machine, rotational motion information obtained by the sensor regarding the rotational motion of the electronic device during the rotational operation is acquired as the motion information.

Accordingly, the control system determines that the electronic device is inside the washing tub, based on the rotational motion of the electronic device caused by the rotational motion of the washing tub. Thus, the control system uses the rotational motion caused by the washing tub to be able to avoid the electronic device being damaged inside the washing tub.

For example, the detection of rotational motion by the sensor is started if the electronic device has received a detection start signal from the washing machine by the wireless communication.

Accordingly, in the control system, it is sufficient for the sensing of acceleration by the acceleration sensor and the determination to be carried out only if the detection start signal has been received, and it is therefore possible to reduce the processing load and to lessen the power consumption.

For example, it is determined whether or not the electronic device is inside the washing tub, based on a comparison between characteristic operation information determined in advance with regard to the preliminary operation and the motion information.

Accordingly, the control system determines that the electronic device is inside the washing tub, based on information regarding characteristic operations of each washing machine, and information regarding the rotational motion acquired by the electronic device. Thus, the control system can avoid the electronic device being damaged inside the washing tub, with a more correct determination.

For example,
the giving the notification is made to a user of the washing machine as well as the washing machine by the wireless communication if the determining step determines that the electronic device is inside the washing tub.

Accordingly, the user receives a notification if the electronic device is inside the washing tub. Thus, the user is able to know that the electronic device is inside the washing tub and implement a countermeasure such as removing the electronic device from the washing tub, and therefore user convenience is improved.

For example, the preliminary operation is an operation in which a liquid is not supplied to inside of the washing tub, and the main operation includes an operation in which the liquid is supplied to inside of the washing tub.

Accordingly, if the electronic device has detected the carrying out of an operation that does not use a liquid (water or the like) that would cause the electronic device to become damaged, it is possible to prohibit an operation that uses the liquid carried out thereafter. Thus, it is possible to avoid the electronic device being damaged due to being immersed in liquid.

For example, the preliminary operation is a weight measurement operation in which the washing tub is caused to rotate in order to measure the weight of laundry inside the washing tub together with the electronic device, and the main operation is a washing operation in which the liquid is used to wash the laundry.

Accordingly, in the laundry weight measurement operation by the washing machine, if it is detected that the electronic device is inside the washing tub, it is possible to prohibit the subsequent washing operation by the washing machine.

Furthermore, a washing machine according to an aspect of the present disclosure is a washing machine including a communication unit for communicating with an electronic device by wireless communication, the washing machine includes: one or more memories; and circuitry operative to: cause the washing machine to operate a washing tub of the washing machine as a preliminary operation; acquire motion information regarding a motion of the electronic device during the preliminary operation; determine whether or not the electronic device is inside the washing tub based on the acquired motion information and information indicating the preliminary operation; and give the washing machine a notification indicating that the electronic device is inside the washing tub if the determining step determines that the electronic device is inside the washing tub.

Thus, the same effect as that previously mentioned is demonstrated.

Furthermore, a server according to an aspect of the present disclosure is a server according to an aspect of the present disclosure is a server that provides a program for causing a computer to execute a control method for a washing machine that is able to communicate with an electronic device by wireless communication, in which the control method for a washing machine includes: acquiring motion information regarding the motion of the electronic device during the preliminary operation by the washing machine; carrying out a determination as to whether or not the electronic device is inside a washing tub of the washing machine, based on the acquired motion information and information indicating the preliminary operation; and issuing a notification for indicating that the electronic device is inside the washing tub, to the washing machine, if it is determined in the determination that the electronic device is inside the washing tub.

Furthermore, a server according to an aspect of the present disclosure is a server that provides a program for causing a computer to execute a control method for a washing machine that is able to communicate with an electronic device by wireless communication, in which the control method for a washing machine includes: as a preliminary operation by the washing machine, causing the washing tub of the washing machine to operate; and prohibiting the main operation if a notification for indicating that the electronic device is inside the washing tub is received.

Furthermore, a non-transitory computer readable recording medium according to an aspect of the present disclosure is a non-transitory computer readable recording medium storing a program causing a computer to perform control for a washing machine including a wireless communication unit for communicating with an electronic device, the program causing the computer to perform operations including: causing the washing machine to operate a washing tub of the washing machine as a preliminary operation; acquiring motion information regarding a motion of the electronic device during the preliminary operation; determining whether or not the electronic device is inside the washing tub based on the acquired motion information and information indicating the preliminary operation; and giving the washing machine a notification indicating that the electronic device is inside the washing tub if the determining step determines that the electronic device is inside the washing tub.

Thus, the same effect as that previously mentioned is demonstrated.

It should be noted that these comprehensive or specific aspects may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereinafter, the embodiments are described with reference to the drawings.

Note that the embodiments described hereinafter all represent comprehensive or specific examples. The numerical values, the shapes, the materials, the constituent elements, the arrangement positions and modes of connection of the constituent elements, the steps, and the order of the steps and so forth given in the following embodiments are examples and are not intended to limit the present disclosure. Furthermore, constituent elements that are not described in the independent claims representing the most significant concepts from among the constituent elements in the following embodiments are described as optional constituent elements.

Embodiment 1

In the present embodiment, the drawings are used to provide a detailed description of a control system provided with a terminal device which has a communication function and a communication device which is an electronic device that wirelessly communicates with the terminal device, in which sensing information and the like of the communication device is used to detect that the communication device is inside a washing tub.

FIG. 1 is an illustrative diagram depicting the configuration of the control system in the present embodiment.

The control system 1 depicted in FIG. 1 includes a terminal device 10 and a communication device 20.

The terminal device 10 and the communication device 20 are able to communicate by wireless communication. Here, it is sufficient as long as the wireless communication method is one with which the terminal device 10 and the communication device 20 are able to transmit and receive information to each other. The wireless communication method may be, for example, Wi-Fi (IEEE 802.11a/b/g or the like), Bluetooth (registered trademark), or RFID or the like.

The terminal device 10 is provided with a controller 105, a main memory 106, and a communication unit 107.

The controller 105 is a controller that controls the functions of the terminal device 10. The controller 105 is realized by, for example, a central processing unit (CPU) or the like. The controller 105 carries out system control for the terminal device 10 except for the communication unit 107.

The main memory 106 is, for example, a memory that is able to store control software for operation by the controller 105, and data that is sensed by the terminal device 10. The main memory 106 may be realized inside an LSI of the controller 105. Furthermore, the main memory 106 may be realized externally as an external device. The main memory 106 is, for example, a random-access memory (RAM) or a nonvolatile memory or the like.

The communication unit 107 is a communication interface for wirelessly communicating with the communication device 20. The communication unit 107, for example, modulates and transmits transfer data to the communication device 20, and demodulates transfer data received from the communication device 20, in accordance with the wireless communication method.

The configuration of the communication device 20 is described in detail hereinafter.

In the aforementioned control system 1, information that the communication device 20 has acquired from a sensor or the like can be transmitted to the terminal device 10. Furthermore, the communication device 20 is able to transmit information received from the terminal device 10 by proximity wireless communication, and information with which a user retained by the communication device 20 or the communication device 20 is able to be specified. The information with which the user or the communication device 20 is able to be specified is, for example, an email address, a telephone number, mobile terminal identification information, or a subscriber identity module (SIM) card ID. Furthermore, if the communication device 20 is able to sense location information, the communication device 20 is additionally able to transfer information for specifying a location. The information for specifying a location is, for example, gyro sensor information, acceleration sensor information, direction sensor information, global positioning system (GPS) information, assisted GPS (A-GPS) information, or location information estimated from a base station of a mobile network, or the like.

Figure 2:
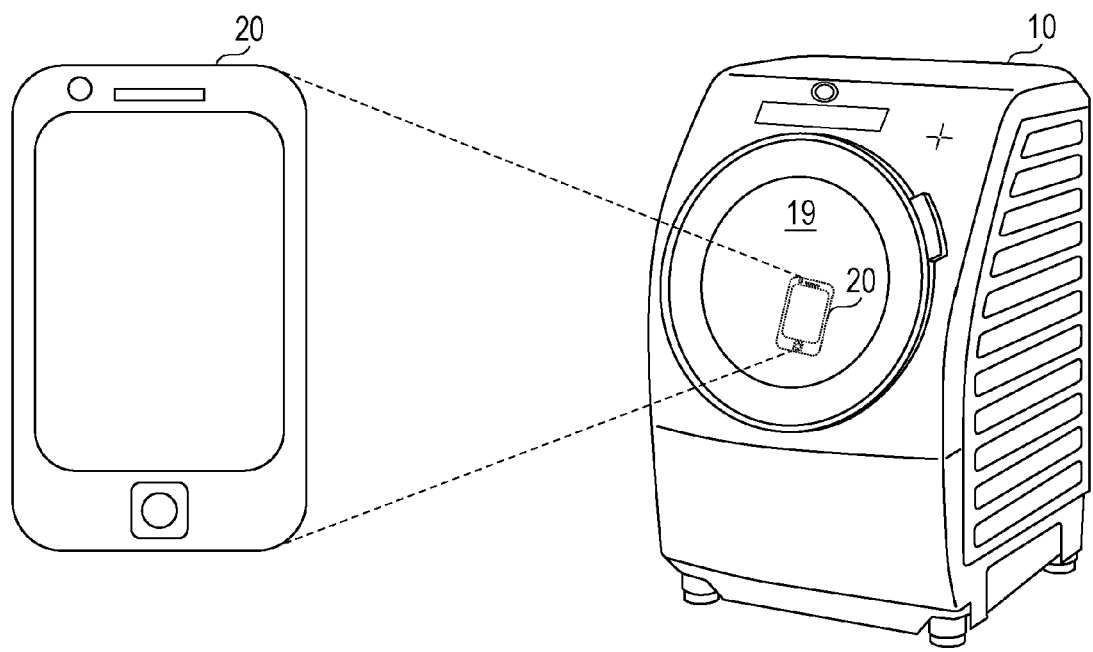
FIG. 2 is an illustrative diagram depicting the specific configuration of the control system in embodiment 1.

FIG. 2 is an illustrative diagram depicting the specific configuration of the control system in the present embodiment.

As depicted in FIG. 2, in the present embodiment, the situation where the terminal device is a washing machine and the electronic device is a cellphone is described as an example; however, this does not limit the present disclosure.

The washing machine 10 is an example of the terminal device 10, and is provided with the constituent elements provided in the terminal device 10. In addition, the washing machine 10 is provided with a washing tub 19.

The washing tub 19 is a tub into which laundry (clothing) and the like to be washed by the washing machine 10 is put. It is assumed that the user puts the laundry to be washed into the washing tub 19. At such time, there is a possibility of the laundry being put into the washing tub 19 while the communication device 20 is inside a pocket or the like in the laundry. In this case, there is a possibility of the communication device 20 being damaged as a result of being put into the washing tub 19 together with the laundry and being immersed in water or the like that is poured in to clean the laundry. Hereinafter, an operation in which water or the like is poured into the washing tub 19 and laundry is cleaned is also referred to as a "main operation".

Furthermore, the washing machine 10 causes the washing tub to operate prior to carrying out washing in order to measure the quantity (weight) of the laundry. In this way, at least part of the operation carried out by the washing machine 10 prior to the main operation is referred to as a "preliminary operation". The operation of the washing tub for measuring the quantity of the laundry is one preliminary operation. Hereinafter, causing the washing tub to operate prior to carrying out washing is described as a preliminary operation. It should be noted that the preliminary operation does not have to be completed when the main operation is started. Furthermore, when an "operation that is subsequent to the preliminary operation" is mentioned, this does not necessarily mean an "operation that is subsequent to the completion of the preliminary operation", and may mean an "operation that is started prior to the completion of the preliminary operation and also continues after the preliminary operation".

In the preliminary operation, the washing machine 10 does not pour liquid such as water into the washing tub. Therefore, even when the communication device 20 is put into the washing tub 19 together with the laundry, the communication device 20 is not immersed in water due to the preliminary operation.

FIG. 3 is a configuration diagram of function blocks of the terminal device in the present embodiment.

As depicted in FIG. 3, the terminal device 10 is provided with a communication unit 301, an inside-tub detection signal reception unit 302, and an operation stop unit 303.

The communication unit 301 receives a signal transmitted from the communication device 20.

The inside-tub detection signal reception unit 302 receives an inside-tub detection signal received by the communication unit 301. The inside-tub detection signal is a signal transmitted from the communication device 20, and is a signal indicating that the communication device 20 is inside the terminal device 10. When the inside-tub detection signal is received, the inside-tub detection signal reception unit 302 transmits an operation stop command to the operation stop unit 303.

When the operation stop command is received from the inside-tub detection signal reception unit 302, the operation stop unit 303 stops the main operation of the terminal device. For example, the pouring of water into the washing tub 19 is stopped.

According to the configuration of FIG. 3, operation can be stopped if the inside-tub detection signal from the electronic device is received.

FIG. 4 is a configuration diagram of function blocks of the communication device in the present embodiment.

As depicted in FIG. 4, the communication device 20 is provided with an inside-tub detection unit 401, a speaker 402, an acceleration sensor 403, a gyro sensor 404, a communication unit 405, a control unit 406, and a mobile network communication unit 407. Furthermore, the inside-tub detection unit 401 is provided with a sensor information acquisition unit 411, an inside-tub determination unit 412, a notification sound start unit 413, and an inside-tub detection signal transmission unit 414.

The sensor information acquisition unit 411 acquires sensor information from the acceleration sensor 403 and the gyro sensor 404, and transmits the sensor information to the inside-tub determination unit 412.

The inside-tub determination unit 412 determines whether or not the communication device 20 is inside the washing tub 19, based on the sensor information received from the sensor information acquisition unit 411. If it is determined that the communication device 20 is inside the washing tub 19, an inside-tub detection signal is transmitted to the notification sound start unit 413 and the inside-tub detection signal transmission unit 414.

When the inside-tub detection signal is received, the notification sound start unit 413 transmits a speaker sound generation instruction to the control unit 406.

When the inside-tub detection signal is received, the inside-tub detection signal transmission unit 414 transmits the inside-tub detection signal to the terminal device 10 by the mobile network communication unit 407.

It should be noted that, in the present embodiment, although the inside-tub detection signal is transmitted by the mobile network communication unit 407, the transmitting to the terminal device 10 is not limited to this, and Bluetooth (registered trade) or Wi-Fi may be used, for example.

The speaker 402 is a device that outputs a sound.

The acceleration sensor 403 is a sensor that detects the acceleration of the communication device 20.

The gyro sensor 404 is a sensor that detects the angular acceleration of the communication device 20.

The communication unit 405 is an interface that wirelessly communicates with the terminal device 10.

The control unit 406 controls each function provided in the communication device 20.

The mobile network communication unit 407 is an interface that carries out communication with a mobile communication network.

It should be noted that a configuration provided with the acceleration sensor 403 and the gyro sensor 404 is described as an example of the communication device 20. These are examples of motion sensors that detect the motion of the communication device 20.

FIG. 5 is a sequence diagram of the control system in the present embodiment. It should be noted that, in the present sequence diagram, a description is given with the terminal device 10 as a washing machine.

In step S501, the terminal device 10 receives a washing start instruction from a user or the like.

In step S502, in order to measure the weight of laundry, the terminal device 10 carries out an operation (preliminary operation) that causes the washing tub 19 to rotate.

In step S511, the sensor information acquisition unit 411 acquires sensor information of the acceleration sensor 403 and the gyro sensor 404 and the like. Step S511 is carried out while the terminal device 10 is causing the washing tub 19 to rotate (step S502).

In step S512, the inside-tub determination unit 412 detects whether or not the communication device 20 is moving due to the rotational motion of the washing tub 19, based on the sensor information of the acceleration sensor 403 and the gyro sensor 404 and the like.

In step S513, the inside-tub detection signal transmission unit 414 transmits an inside-tub detection signal to the terminal device 10. The inside-tub detection signal is transmitted if the inside-tub determination unit 412 has detected in step S512 that the communication device 20 is moving.

In step S514, the notification sound start unit 413 causes the alarm of the communication device 20 to sound. Similar to the above, the alarm is sounded if the inside-tub determination unit 412 has detected in step S512 that the communication device 20 is moving.

In step S503, the terminal device 10 stops the pouring of water into the washing tub 19. The pouring of water is stopped if the inside-tub detection signal reception unit 302 has received the inside-tub detection signal. Thus, the terminal device 10 prohibits the main operation if the inside-tub detection signal has been received.

It should be noted that, in the aforementioned description, although it has been described that the main operation is prohibited after the completion of the preliminary operation, the main operation may be prohibited during the preliminary operation.

According to the aforementioned series of operations, it is possible for the pouring of water into the washing tub 19 to be prohibited if it is detected that the communication device 20 is inside the washing tub 19. Thus, it is possible to avoid the communication device 20 being damaged due to being immersed in poured water or the like.

It should be noted that, although the situation where the terminal device 10 is a washing machine has been described as an example in the aforementioned description, a refrigerator or a microwave oven or the like are possible as other examples of the terminal device 10.

In the situation where the terminal device 10 is a refrigerator, the communication device 20 detects that it is inside the refrigerator by sensing the vibration or the like of the refrigerator with a gyro sensor or the like inside the refrigerator. It is then possible for the communication device 20 or the refrigerator to avoid the communication device 20 being continued to be left inside the refrigerator, by notifying that the communication device 20 is inside the refrigerator.

Furthermore, in the situation where the terminal device 10 is a microwave oven, the communication device 20 detects that it is inside the microwave oven by sensing the rotation or the like of a turntable with a gyro sensor or the like inside the microwave oven. It is then possible for the communication device 20 or the microwave oven to avoid the communication device 20 being left inside the refrigerator or microwaves being irradiated, by notifying that the communication device 20 is inside the microwave oven.

As described above, the control system of the present embodiment uses the motion information obtained from the sensor information of the electronic device, to determine whether or not the electronic device is inside the washing tub. If it is detected that the electronic device is inside the washing tub, control is carried out in such a way that notification is carried out by transmitting an alarm notification or a washing machine stop signal to the washing machine to thereby prohibit the main operation by the washing machine. Here, because the motion information of the electronic device is used, it is possible to correctly determine that the electronic device is inside the washing tub, based on the motion of the electronic device inside the washing tub. Thus, the control system can avoid the electronic device being damaged inside the washing tub.

Embodiment 2

In the present embodiment, the drawings are used to provide a detailed description of a first example of a technique in which, in a control system which is able to detect that a communication device is inside a washing tub, the communication device receives a trigger that starts inside-tub detection, from a terminal device.

FIG. 6 is a configuration diagram of function blocks of the terminal device in the present embodiment.

As depicted in FIG. 6, a terminal device 11 is provided with a connection signal transmission unit 601, an inside-tub detection start request transmission unit 602, an inside-tub detection signal reception unit 604, a communication unit 603, and an operation stop unit 605.

The connection signal transmission unit 601 transmits and receives information regarding a communication connection with a communication device 21, by the communication unit 603.

The inside-tub detection start request transmission unit 602 transmits an inside-tub detection start request signal, which is a signal with which the terminal device 11 requests the communication device 21 to start inside-tub detection.

The inside-tub detection signal reception unit 604 receives an inside-tub detection signal from an electronic device.

The operation stop unit 605 stops operations and stops the pouring of water when the inside-tub detection signal is received.

Figure 7:
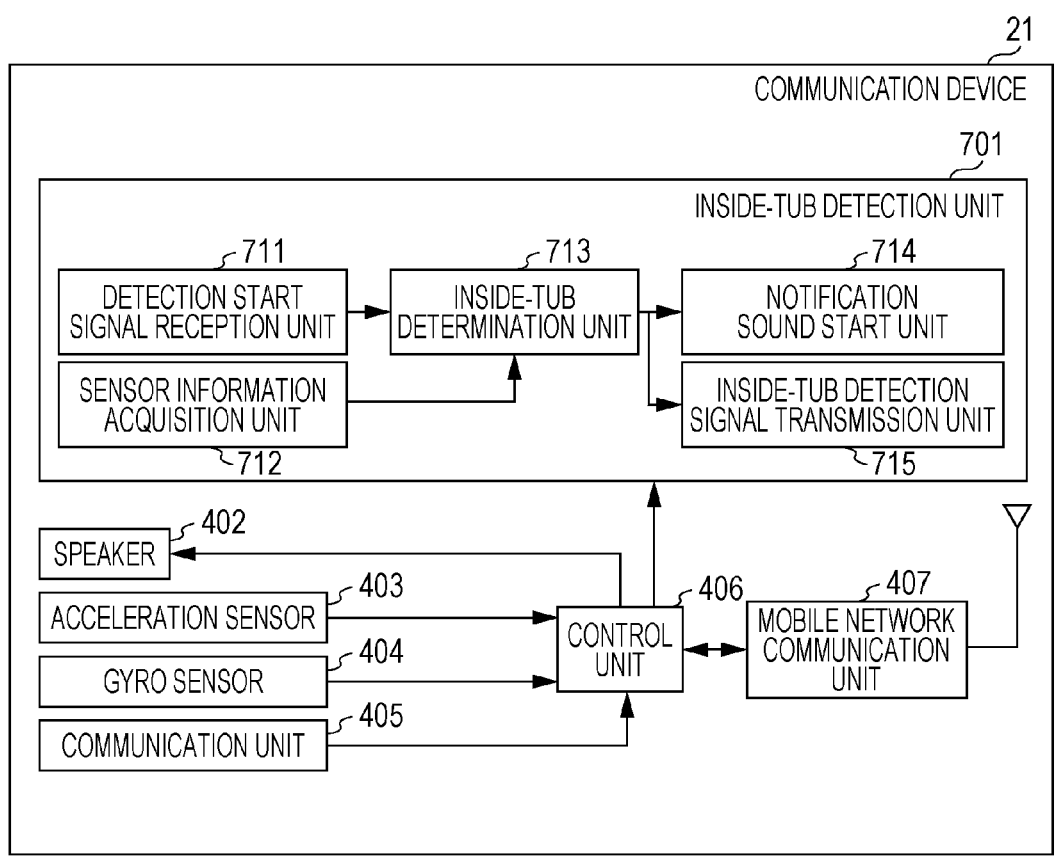
FIG. 7 is a configuration diagram of function blocks of a communication device in embodiment 2.

FIG. 7 is a configuration diagram of function blocks of the communication device in the present embodiment.

As depicted in FIG. 7, the communication device 21 is provided with an inside-tub detection unit 701, a speaker 402, an acceleration sensor 403, a gyro sensor 404, a communication unit 405, a control unit 406, and a mobile network communication unit 407. Furthermore, the inside-tub detection unit 701 is provided with a detection start signal reception unit 711, a sensor information acquisition unit 712, an inside-tub determination unit 713, a notification sound start unit 714, and an inside-tub detection signal transmission unit 715. It should be noted that the same reference numbers have been appended to function blocks that are the same as those of the communication device 20 in embodiment 1 and descriptions thereof have been omitted.

The detection start signal reception unit 711 receives an inside-tub detection start request signal from the terminal device 11.

When the inside-tub detection start request signal is received, the sensor information acquisition unit 712 acquires sensor information of the acceleration sensor 403 and the gyro sensor 404, and transmits the acquired sensor information to the inside-tub determination unit 713.

The inside-tub determination unit 713 determines whether or not the communication device 21 is inside the washing tub 19, based on the sensor information acquired from the sensor information acquisition unit 712. If it is determined that the communication device 21 is inside the washing tub 19, the inside-tub determination unit 713 transmits an inside-tub detection signal to the notification sound start unit 714 and the inside-tub detection signal transmission unit 715.

When the inside-tub detection signal is received, the notification sound start unit 714 transmits a speaker sound generation instruction to the control unit 406.

When the inside-tub detection signal is received, the inside-tub detection signal transmission unit 715 transmits the inside-tub detection signal to the terminal device by the mobile network communication unit 407.

Figure 8:
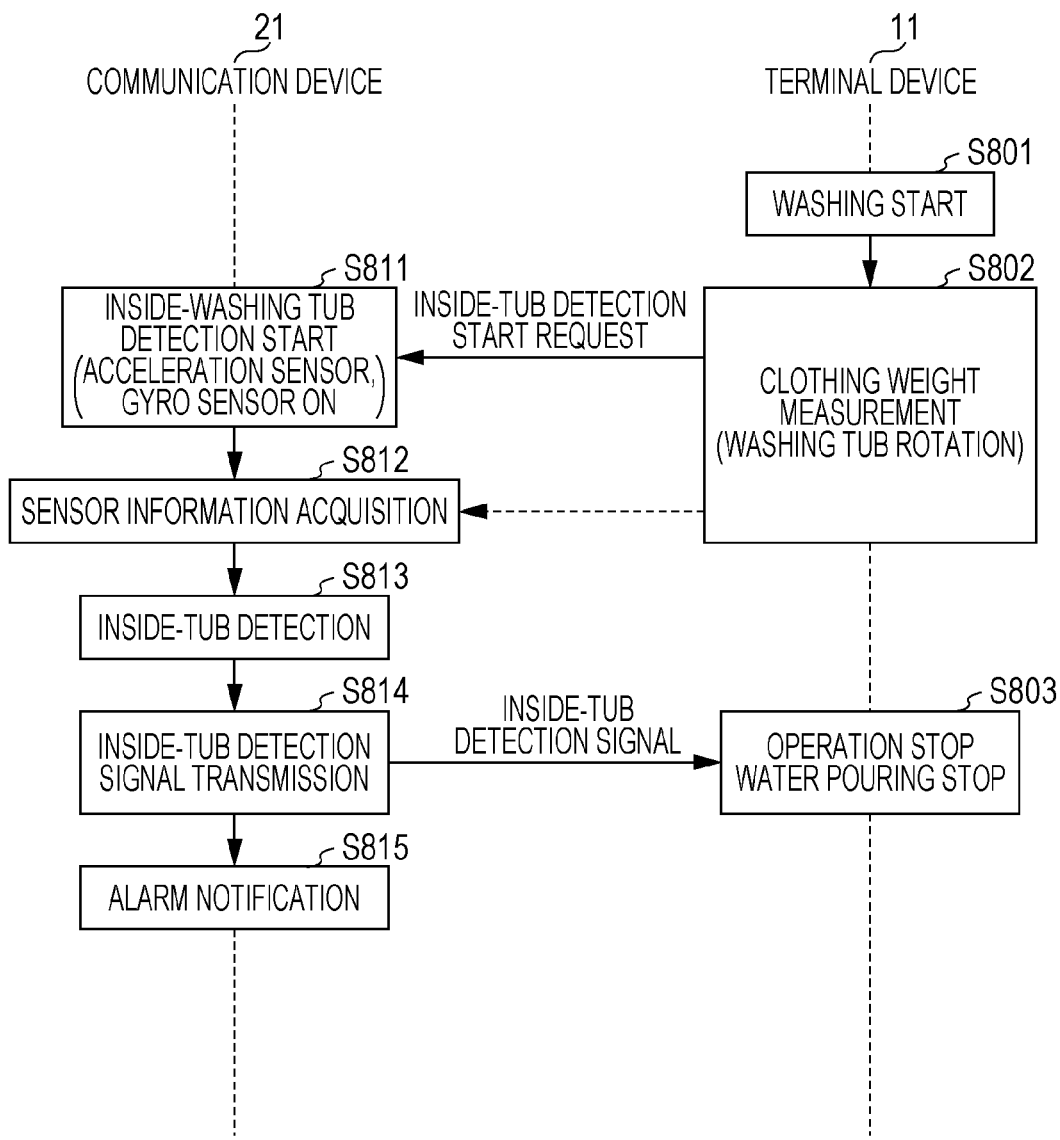
FIG. 8 is a sequence diagram of a control system in embodiment 2.

FIG. 8 is a sequence diagram of the control system in the present embodiment.

In step S801, the terminal device 11 receives a washing start instruction from a user or the like.

In step S802, in order to measure the weight of laundry, the terminal device 11 carries out an operation that causes the washing tub 19 to rotate. Furthermore, the terminal device 11 transmits an inside-tub detection start request signal to the communication device 21.

In step S811, the communication device 21 receives the inside-tub detection start request signal. When the inside-tub detection start request signal is received, the communication device 21 activates various sensors such as the acceleration sensor 403 and the gyro sensor 404.

In step S812, the sensor information acquisition unit 712 acquires sensor information from the various sensors.

The processing of step S813 to step S815 is the same as the processing of step S512 to step S514 of FIG. 5.

In step S803, the terminal device 11 stops the pouring of water into the washing tub 19. The pouring of water is stopped when the inside-tub detection signal reception unit 604 has received the inside-tub detection signal.

Thus, the terminal device 11 being damaged due to the pouring of water into the washing tub 19 is avoided.

Modified Example of Embodiment 2

In the present embodiment, the drawings are used to provide a detailed description of a second example of a technique in which, in a control system which is able to detect that a communication device is inside a washing tub, the communication device receives a trigger that starts inside-tub detection, from a terminal device.

Figure 9:
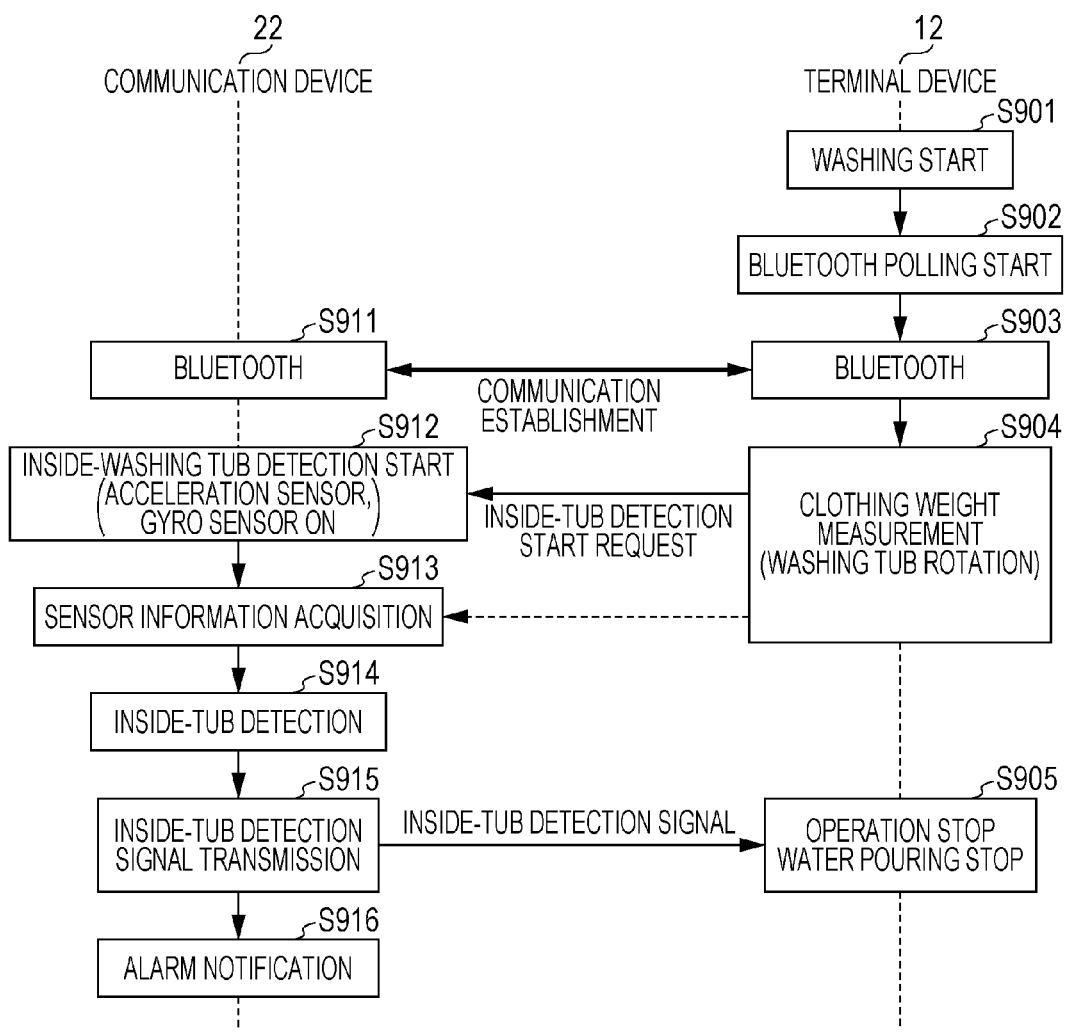
FIG. 9 is a sequence diagram of a control system in a modified example of embodiment 2.

FIG. 9 is a sequence diagram of the control system in the present modified example.

In step S901, a terminal device 12 receives a washing start instruction from a user or the like.

In step S902, the terminal device 12 starts polling to establish communication.

In step S903, the terminal device 12 establishes communication with a communication device 22. The communication is, for example, wireless communication according to a Bluetooth (registered trademark) standard. However, the communication is not limited to a Bluetooth (registered trademark) standard, and may also be another wireless communication standard (Wi-Fi or the like).

In step S904, in order to measure the weight of laundry, the terminal device 12 carries out an operation that causes the washing tub 19 to rotate. Furthermore, the terminal device 12 transmits an inside-tub detection start request signal to the communication device 22 by the wireless communication established in step S903.

It should be noted that the processing for establishing communication of step S903 may be carried out at the time of the weight measurement of step S904.

In step S911, the communication device 22 establishes communication with the terminal device 12. Step S911 corresponds to the processing for establishing communication in the terminal device 12 of step S903.

In step S912, the communication device 22 receives the inside-tub detection start request signal. When the inside-tub detection start request signal is received, the communication device 22 activates various sensors such as the acceleration sensor 403 and the gyro sensor 404.

In step S913, the sensor information acquisition unit 712 acquires sensor information from the various sensors.

The processing of step S914 to step S916 is the same as the processing of step S512 to step S514 of FIG. 5.

In step S905, the terminal device 12 stops the pouring of water into the washing tub 19. The pouring of water is stopped when the inside-tub detection signal reception unit 604 has received the inside-tub detection signal.

Thus, the terminal device 12 being damaged due to the pouring of water into the washing tub 19 is avoided.

As described above, in the control system in the present embodiment, it is sufficient for the sensing of acceleration by the acceleration sensor and the determination to be carried out only if the detection start signal has been received, and it is therefore possible to reduce the processing load and to lessen the power consumption.

Embodiment 3

Figure 10:
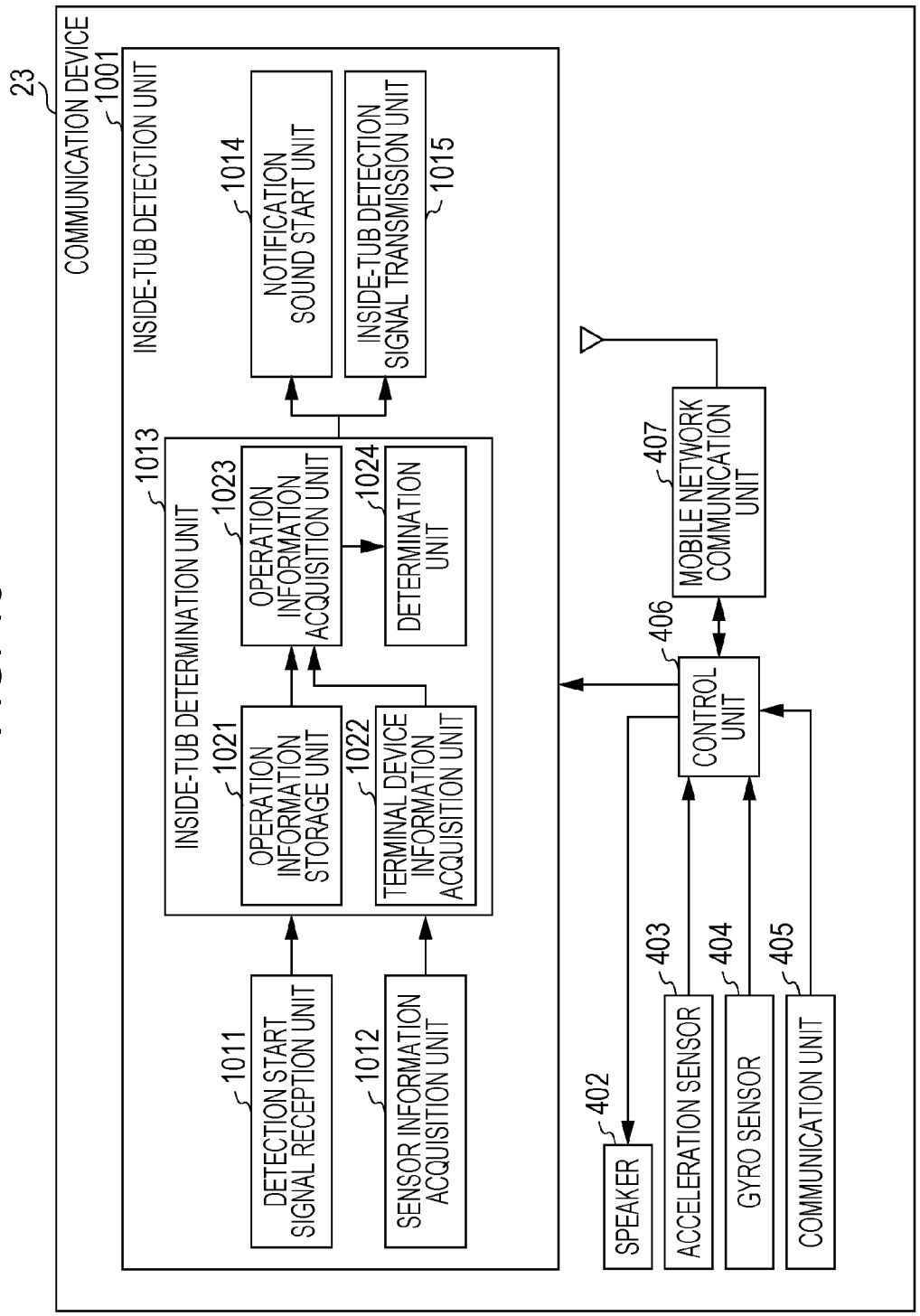
FIG. 10 is a configuration diagram of function blocks of a communication device in embodiment 3.

FIG. 10 is a configuration diagram of function blocks of a communication device in the present embodiment.

As depicted in FIG. 10, a communication device 23 is provided with an inside-tub detection unit 1001, a speaker 402, an acceleration sensor 403, a gyro sensor 404, a communication unit 405, a control unit 406, and a mobile network communication unit 407. Furthermore, the inside-tub detection unit 1001 is provided with a detection start signal reception unit 1011, a sensor information acquisition unit 1012, an inside-tub determination unit 1013, a notification sound start unit 1014, and an inside-tub detection signal transmission unit 1015. Furthermore, the inside-tub determination unit 1013 is provided with an operation information storage unit 1021, a terminal device information acquisition unit 1022, an operation information acquisition unit 1023, and a determination unit 1024. It should be noted that the same reference numbers have been appended to the function blocks that are the same as those of the communication device 20 in embodiment 1 and descriptions thereof have been omitted.

The detection start signal reception unit 1011, the sensor information acquisition unit 1012, the notification sound start unit 1014, and the inside-tub detection signal transmission unit 1015 are the same as the detection start signal reception unit 711, the sensor information acquisition unit 712, the notification sound start unit 714, and the inside-tub detection signal transmission unit 715 of embodiment 2 (FIG. 7).

The inside-tub determination unit 1013 determines whether or not the communication device 23 is inside the washing tub 19, based on operation information stored by the operation information storage unit 1021 and sensor information acquired from the sensor information acquisition unit 1012. If it is determined that the communication device 23 is inside the washing tub 19, the inside-tub determination unit 1013 transmits an inside-tub detection signal to the notification sound start unit 1014 and the inside-tub detection signal transmission unit 1015.

The operation information storage unit 1021 stores information (characteristic operation information) indicating the motion of the washing tub 19 of the terminal device 13. The characteristic operation information is described in detail later.

The terminal device information acquisition unit 1022 acquires terminal device information indicating item number information or the like of the terminal device 13.

The operation information acquisition unit 1023 acquires the characteristic operation information indicating the motion of the washing tub 19, from the operation information storage unit 1021, based on terminal information of the terminal device 13.

The determination unit 1024 determines whether or not the communication device 23 is inside the washing tub 19, based on the characteristic operation information acquired from the operation information storage unit 1021 and sensor information acquired from the sensor information acquisition unit 1012.

Figure 11:
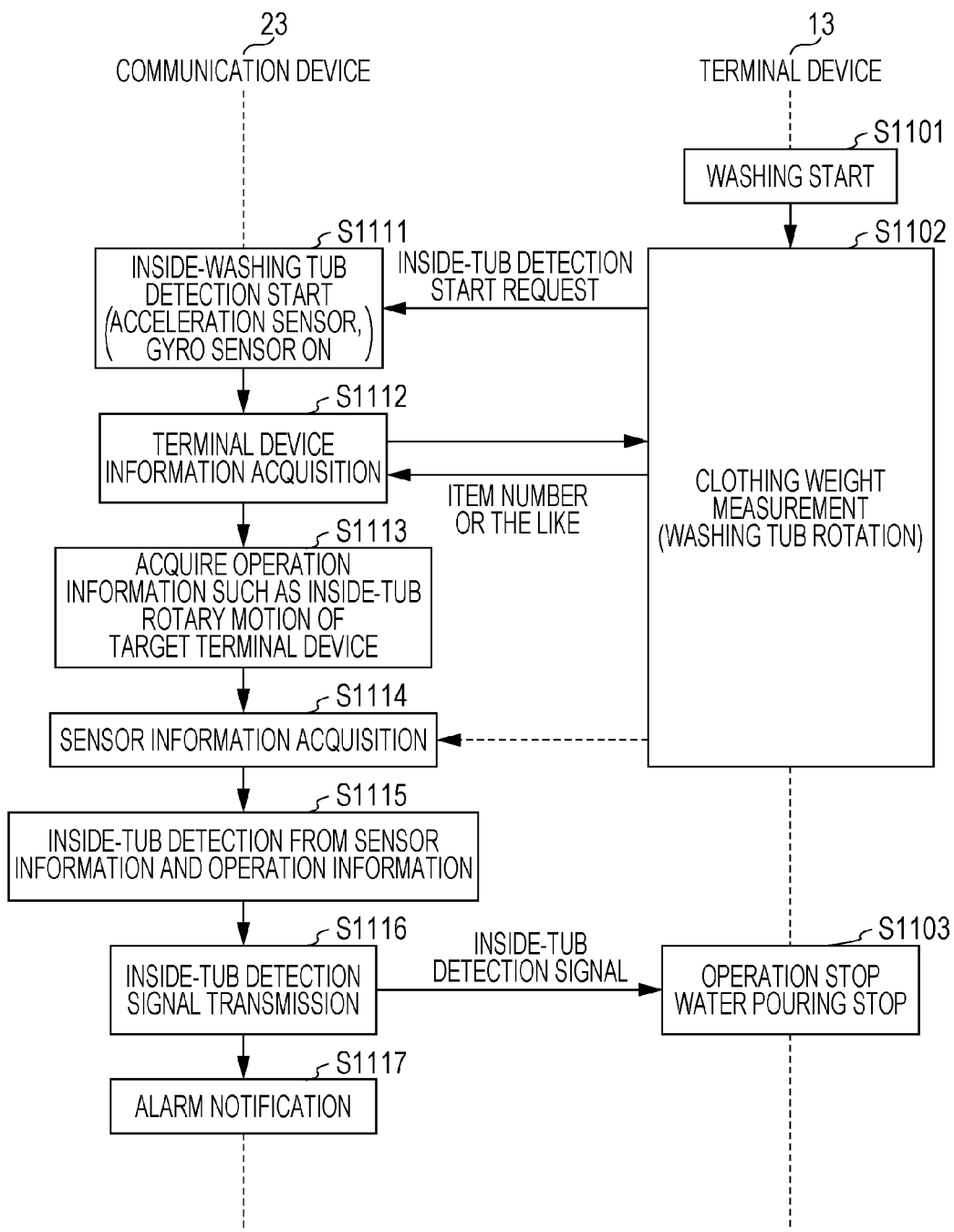
FIG. 11 is a sequence diagram of a control system in embodiment 3.

FIG. 11 is a sequence diagram of the control system in the present embodiment. The flow of the processing of the terminal device 13 and the communication device 23 is illustrated in FIG. 11. It should be noted that the terminal device 13 is the same as the terminal device 11 in embodiment 2.

In step S1101, the terminal device 13 receives a washing start instruction from a user or the like.

In step S1102, in order to measure the weight of laundry, the terminal device 13 carries out an operation that causes the washing tub 19 to rotate. Furthermore, the terminal device 13 transmits an inside-tub detection start request signal to the communication device 23.

In step S1111, the detection start signal reception unit 1011 receives the inside-tub detection start request signal. The detection start signal reception unit 1011 activates various sensors such as the acceleration sensor 403 and the gyro sensor 404 when the inside-tub detection start request signal is received.

In step S1112, the terminal device information acquisition unit 1022 acquires terminal device information indicating item number information or the like of the terminal device 13.

In step S1113, the operation information acquisition unit 1023 acquires operation information such as the rotational motion inside the washing tub 19 of the terminal device 13, based on the terminal information acquired by the terminal device information acquisition unit 1022.

In step S1114, the sensor information acquisition unit 1012 acquires sensor information.

In step S1115, based on the sensor information acquired in step S1114, the determination unit 1024 determines whether the communication device 23 is moving due to the rotational motion of the washing tub 19, or in other words, whether or not the communication device 23 is inside the washing tub 19.

In step S1116, the inside-tub detection signal transmission unit 1015 transmits an inside-tub detection signal to the terminal device. The processing of step S1116 is carried out if the determination unit 1024 has determined in step S1115 that the communication device 23 is moving.

In step S1117, the notification sound start unit 1014 causes the alarm of the communication device 23 to sound. Similar to the above, the processing of step S1117 is carried out when the determination unit 1024 has determined in step S1115 that the communication device 23 is moving.

In step S1103, the terminal device 13 stops the pouring of water into the washing tub 19. The pouring of water is stopped when the inside-tub detection signal reception unit 604 has received the inside-tub detection signal.

Thus, the terminal device 13 being damaged due to the pouring of water into the washing tub 19 is avoided.

FIG. 12 is an illustrative diagram of the characteristic operation information of a terminal device in the present embodiment.

The operation information storage unit 1021 stores a characteristic operation information table in which model information indicating the item number or the like of a washing machine, and electronic device sensor information indicating the operation state in that model are associated.

For example, if the terminal device 13 is a washing machine, the operation information represents information regarding the pre-rotational motion performed when weight is measured.

The characteristic operation information table 1201 depicted in FIG. 12 associates and manages information indicating a model 1211 and information indicating characteristic operation information 1212.

For example, gyro sensor values (a1, a2) and acceleration sensor values (b1, b2) are associated as the characteristic operation information of the "item number A" model. In this case, the characteristic operation information indicates that an initial rotational motion is carried out at angular acceleration a1, and next a rotational motion having angular acceleration a2 is carried out. Furthermore, similarly, the characteristic operation information indicates that the initial rotational motion is carried out at acceleration b1, and next a rotational motion having acceleration b2 is carried out.

It should be noted that the time (time length) for which a rotational motion is carried out may be included in addition to the aforementioned information. Specifically, information in which acceleration or angular acceleration is combined with time length is permissible. In addition, a plurality of information having the aforementioned combination may be linked. In other words, information such as "(10 degrees/sec$^2$, 10 sec) as first motion information and (−10 degrees/sec$^2$, 10 sec) as second the motion information" may be used.

It should be noted that it is possible for the angular acceleration of the rotational motion or the acceleration to change according to the weight of the laundry put into the washing tub 19. In order to handle this, the angular acceleration of the rotational motion or the acceleration, which are sensor information acquired by the communication device 23, may be corrected according to the weight of the laundry put into the washing tub 19. For example, when the weight of the laundry is greater than a prescribed value (when there is a lot of laundry), the angular acceleration or the acceleration may be decreased to a prescribed proportion.

It should be noted that the acceleration and the angular acceleration that are sensor information acquired by the communication device 23 may be corrected according to the distance from the center of rotation of the washing tub 19. Thus, it is possible to handle a change in acceleration corresponding to the distance from the center of rotation of the washing tub 19 to the communication device 23.

It should be noted that, if the communication device 23 has deviated from a circular motion, the aforementioned time length may be taken into consideration to exclude the motion performed when the communication device 23 deviated from the circular motion and to carry out a comparison with the characteristic operation information. Thus, for example, it is also possible to handle the situation where, when there is not much laundry, a motion in which the communication device 23 has dropped downward from the upper-side wall surface inside the washing tub and deviated from the circular motion has occurred during the rotational operation of the washing tub.

It should be noted that, although an example in which there is characteristic operation information for each one item number has been presented, one item of characteristic operation information does not necessarily have to correspond to one item number. For example, one item of characteristic operation information may correspond to a plurality of item numbers.

As described above, the control system in the present embodiment determines that the electronic device is inside the washing tub, based on the rotational motion of the electronic device caused by the rotational motion of the washing tub. Thus, the control system uses the rotational motion caused by the washing tub to be able to avoid the electronic device being damaged inside the washing tub.

Embodiment 4

In the present embodiment, the drawings are used to provide a detailed description of a system provided with a terminal device which has a communication function, a communication device which wirelessly communicates with the terminal device, and a mobile device which is an electronic device that wirelessly communicates with the communication device, in which sensing information and the like of the mobile device is used to be able to detect that the mobile device is inside a washing tub.

Figure 13:
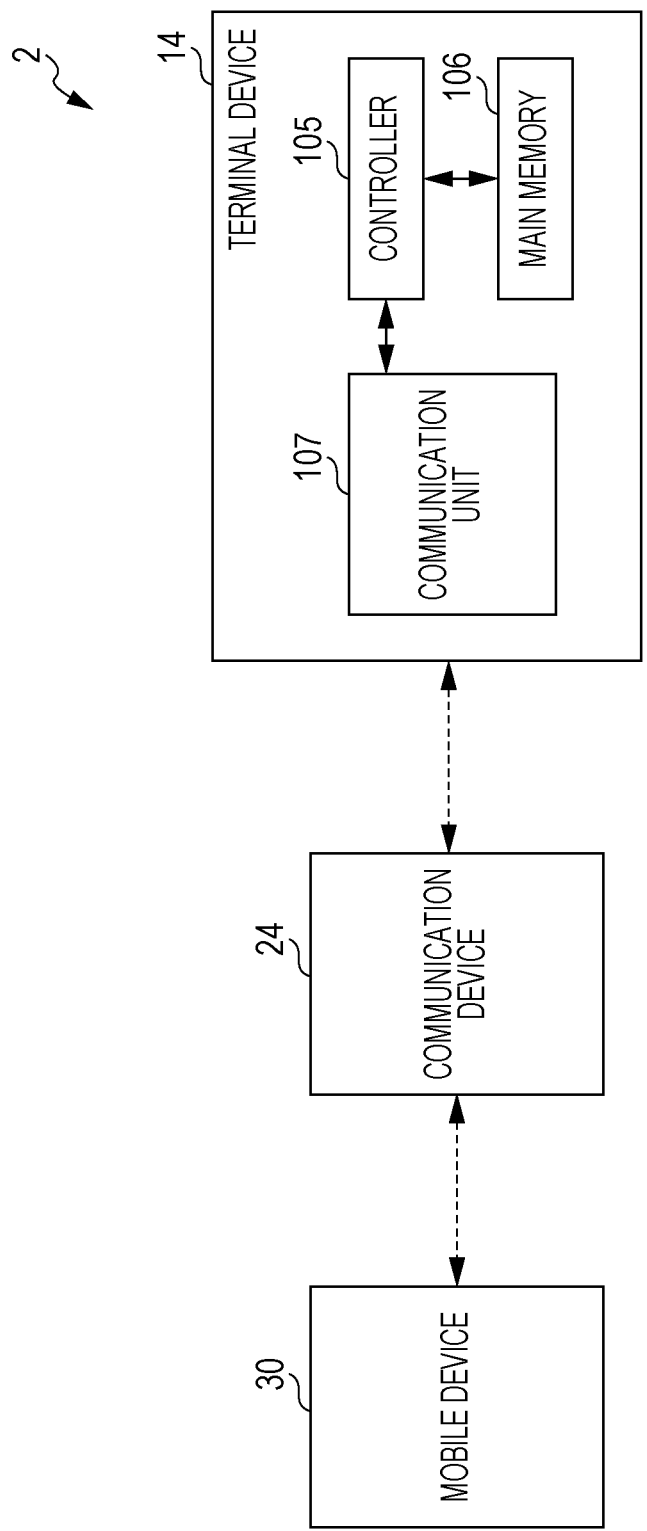
FIG. 13 is an illustrative diagram depicting the configuration of a control system in embodiment 4.

FIG. 13 is an illustrative diagram depicting the configuration of the control system according to the present embodiment. The control system 2 depicted in FIG. 13 includes a terminal device 14, a communication device 24, and a mobile device 30.

The terminal device 14 and the communication device 24 are able to communicate by wireless communication. Furthermore, the mobile device 30 and the communication device 24 are able to communicate by wireless communication. Here, it is sufficient as long as the wireless communication method is one with which the transmission and reception of information is able to be mutually carried out between the terminal device 14 and the communication device 24, and between the communication device 24 and the mobile device 30. The wireless communication method may be, for example, Wi-Fi (IEEE 802.11a/b/g or the like), Bluetooth (registered trademark), or RFID or the like.

The terminal device 14 is provided with a controller 105, a main memory 106, and a communication unit 107.

The controller 105 is a controller that controls the functions of the terminal device 14. The controller 105 is realized by, for example, a CPU or the like. The controller 105 carries out system control for the terminal device 14 except for the communication unit 107.

The main memory 106 is, for example, a memory that is able to store control software for operation by the controller 105, and data that is sensed by the terminal device 14. The main memory 106 may be realized inside an LSI of the controller 105, and may also be realized externally as an external device. The main memory 106 is, for example, a RAM or a nonvolatile memory or the like.

The communication unit 107 is a communication interface for wirelessly communicating with the communication device 24. The communication unit 107, for example, modulates and transmits transfer data to the communication device 24, and demodulates transfer data received from the communication device 24, in accordance with the wireless communication method.

According to the control system 2 as described above, information that the mobile device 30 has acquired from a sensor or the like can be transmitted to the terminal device 14 via the communication device 24.

Figure 14:
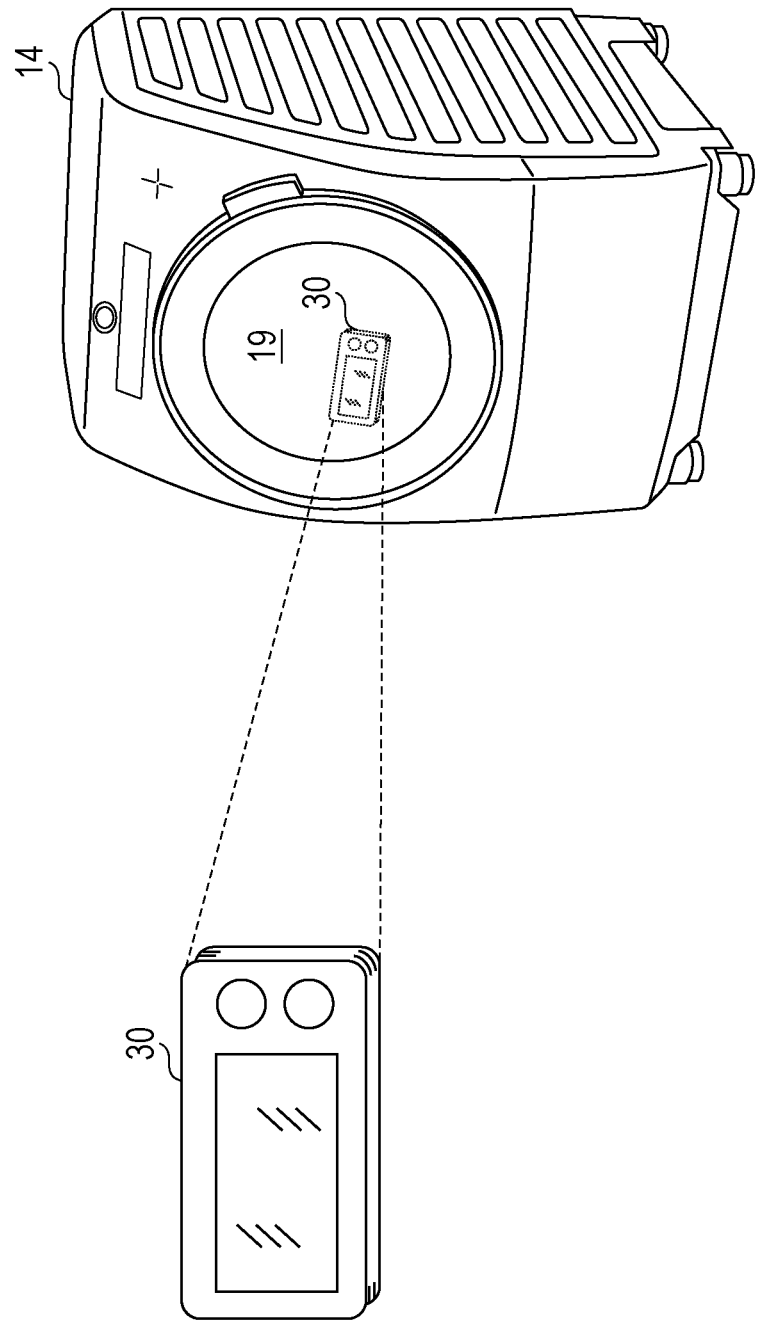
FIG. 14 is an illustrative diagram depicting the specific configuration of the control system in embodiment 4.

FIG. 14 is an illustrative diagram depicting the specific configuration of the control system in the present embodiment.

As depicted in FIG. 14, in the present embodiment, a description is given hereinafter with regard to the situation where the mobile device 30 is inside the washing tub 19.

FIG. 15 is a configuration diagram of function blocks of the terminal device in the present embodiment.

As depicted in FIG. 15, the terminal device 14 is provided with a communication unit 1501, an inside-tub detection signal reception unit 1502, and an operation stop unit 1503.

The inside-tub detection signal reception unit 1502 receives an inside-tub detection signal from the communication device 24. It should be noted that the inside-tub detection signal reception unit 1502 is the same as the inside-tub detection signal reception unit 302 in embodiment 1.

The operation stop unit 1503 stops operations and stops the pouring of water when the inside-tub detection signal is received. It should be noted that the operation stop unit 1503 is the same as the operation stop unit 605 in embodiment 1.

FIG. 16 is a configuration diagram of function blocks of the communication device in the present embodiment.

As depicted in FIG. 16, the communication device 24 includes a speaker 402, a communication unit 405, a control unit 406, a mobile network communication unit 407, and an inside-tub detection unit 1601. Furthermore, the inside-tub detection unit 1601 is provided with an inside-tub detection signal reception unit 1611 and an inside-tub detection signal transmission unit 1612. The same reference numbers have been appended to constituent elements that are the same as those of the communication device 20 in embodiment 1 and descriptions thereof have been omitted.

The inside-tub detection signal reception unit 1611 receives an inside-tub detection signal from the mobile device 30.

When the inside-tub detection signal is received, the inside-tub detection signal transmission unit 1612 transmits the inside-tub detection signal to the terminal device 14.

Furthermore, when the inside-tub detection signal is received, the communication device 24 notifies that the mobile device 30 is inside the washing tub 19, by causing the speaker 402 to generate a sound or communicating by the mobile network communication unit 407.

Figure 17:
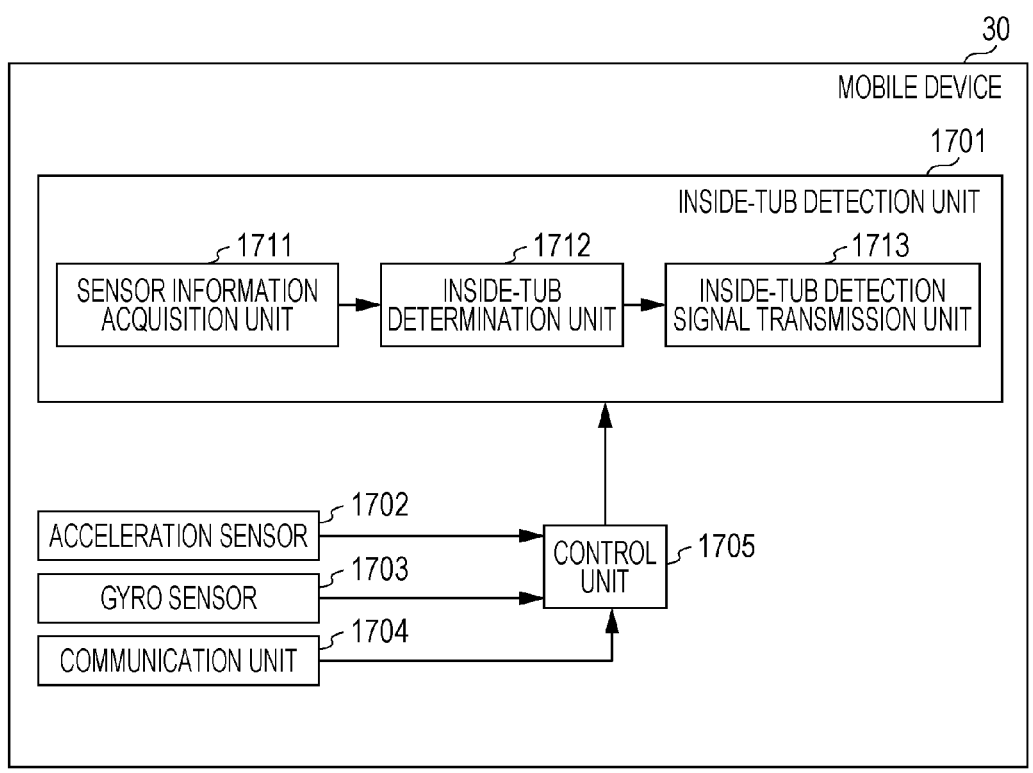
FIG. 17 is a configuration diagram of function blocks of a mobile device in embodiment 4.

FIG. 17 is a configuration diagram of function blocks of the mobile device in the present embodiment.

As depicted in FIG. 17, the mobile device 30 is provided with an inside-tub detection unit 1701, an acceleration sensor 1702, a gyro sensor 1703, a communication unit 1704, and a control unit 1705. Furthermore, the inside-tub detection unit 1701 is provided with a sensor information acquisition unit 1711, an inside-tub determination unit 1712, and an inside-tub detection signal transmission unit 1713.

The sensor information acquisition unit 1711 acquires sensor information from the acceleration sensor and the gyro sensor, and transmits the sensor information to the inside-tub determination unit 1712.

The inside-tub determination unit 1712 determines whether or not the mobile device 30 is inside the washing tub 19, based on the sensor information received from the sensor information acquisition unit 1711. If it is determined that the mobile device 30 is inside the washing tub 19, an inside-tub detection signal is transmitted to the inside-tub detection signal transmission unit 1713.

When the inside-tub detection signal is received, the inside-tub detection signal transmission unit 1713 transmits the inside-tub detection signal to the communication device 24 by the communication unit 1704.

Figure 18:
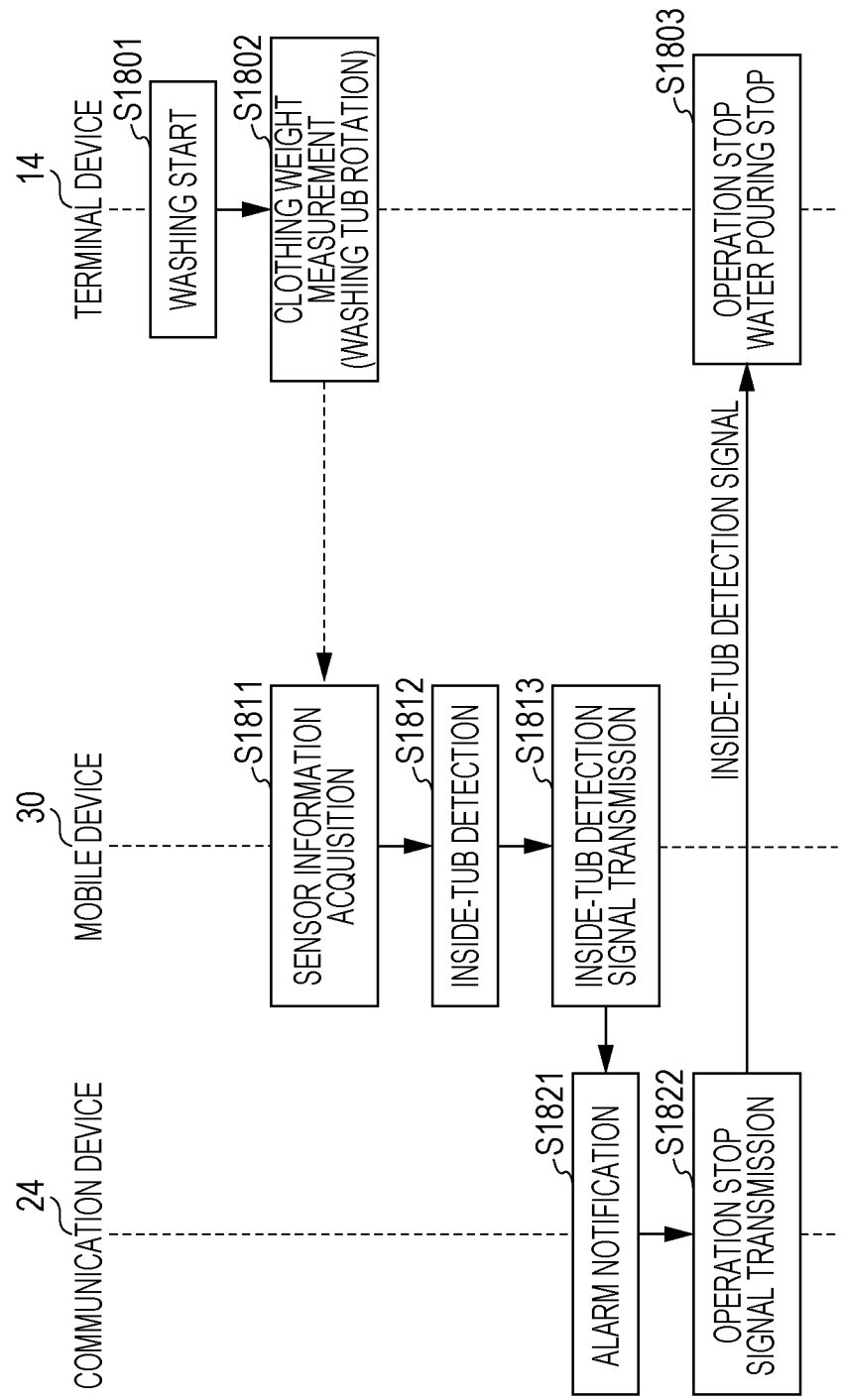
FIG. 18 is a sequence diagram of the control system in embodiment 4.

FIG. 18 is a sequence diagram of the control system in the present embodiment.

In step S1801, the terminal device 14 receives a washing start instruction from a user or the like.

In step S1802, in order to measure the weight of laundry, the terminal device 14 carries out an operation that causes the washing tub 19 to rotate.

In step S1811, the sensor information acquisition unit 1711 activates sensors such as the acceleration sensor 1702 and the gyro sensor 1703, and acquires sensor information. It should be noted that the sensor information is acquired while the terminal device 14 is causing the washing tub 19 to rotate (step S1802).

In step S1812, the inside-tub determination unit 1712 detects whether or not the mobile device 30 is moving due to the rotational motion of the washing tub 19, based on the sensor information of the acceleration sensor 1702 and the gyro sensor 1703 and the like.

In step S1813, the inside-tub detection signal transmission unit 1713 transmits an inside-tub detection signal to the communication device 24. The inside-tub detection signal is transmitted if the inside-tub determination unit 1712 has detected in step S1812 that the mobile device 30 is moving.

In step S1821, the communication device 24 causes the alarm of the communication device 24 to sound. The alarm is sounded when the communication device 24 has received the inside-tub detection signal transmitted by the mobile device 30 in step S1813.

In step S1822, the inside-tub detection signal transmission unit 1612 transmits the inside-tub detection signal to the terminal device 14.

In step S1803, the terminal device 14 stops the pouring of water into the washing tub 19. The pouring of water is stopped when the inside-tub detection signal reception unit 1502 has received the inside-tub detection signal. Thus, the terminal device 14 prohibits the main operation when the inside-tub detection signal has been received.

It should be noted that the communication section can use near field communication (NFC), Bluetooth (registered trademark), a wireless LAN, or a cellphone network but is not limited to these.

It should be noted that, although a description has been given heretofore using a gyro sensor and an acceleration sensor as the sensors, the present disclosure is not limited to these. For example, a temperature sensor or a humidity sensor or the like may be used.

It should be noted that, although a description has been given using a washing machine in the present embodiment, the present disclosure is not limited to this. For example, it may be the case that an electronic device inside a refrigerator is detected based on the temperature condition or humidity condition of a temperature sensor or humidity sensor.

It should be noted that it is possible for the aforementioned embodiments to be realized as in the modified examples presented hereinafter.

Figure 19:
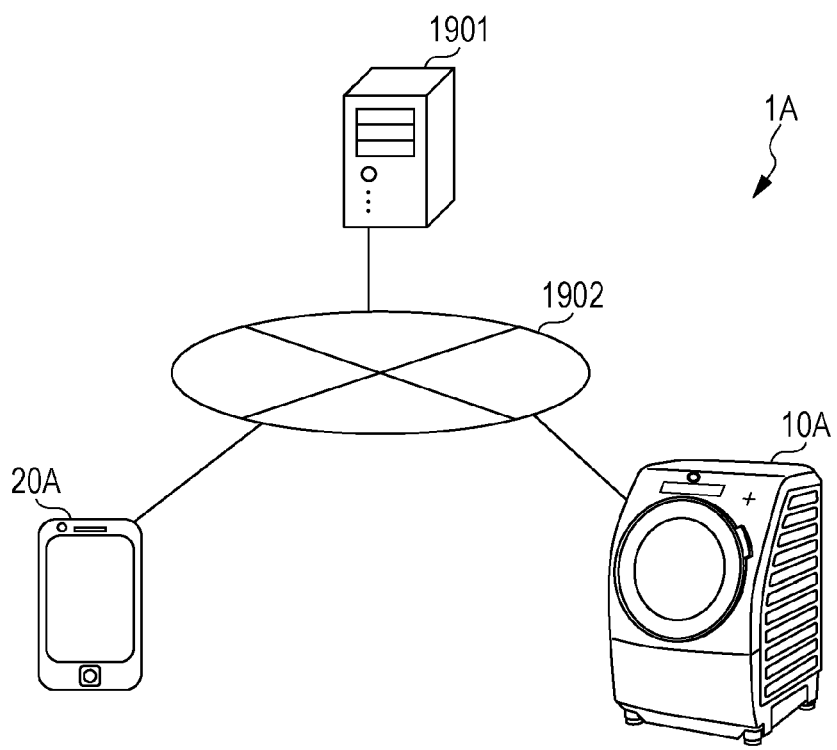
FIG. 19 is an illustrative diagram depicting a first modified example of a control system in the embodiments.

FIG. 19 is an illustrative diagram depicting a first modified example of a control system in the embodiments.

The control system 1A depicted in FIG. 19 is provided with a terminal device 10A, a communication device 20A, and a processing server 1901. The terminal device 10A, the communication device 20A, and the processing server 1901 are able to communicate with each other by a communication network 1902.

The terminal device 10A corresponds to the terminal devices 10, 11, 12, 13, and 14 in the embodiments; however, part of the processing thereof is carried out by the processing server 1901. When the processing is to be carried out by the processing server 1901, the terminal device 10A transmits information to be input for the processing, to the processing server 1901 by the communication network 1902, and receives information that is the result processed by the processing server 1901, by the communication network 1902.

The processing server 1901 receives information from the terminal device 10A by the communication network 1902, carries out processing on the basis of the received information, and transmits a processing result to the terminal device 10A by the communication network 1902.

The communication device 20A corresponds to the communication devices 20, 21, 22, 23, and 24 in the embodiments; however, part of the processing thereof is carried out by the processing server 1901. When the processing is to be carried out by the processing server 1901, the communication device 20A transmits information to be input for the processing, to the processing server 1901 by the communication network 1902, and receives information that is the result processed by the processing server 1901, by the communication network 1902.

The processing server 1901 receives information from the terminal device 10A by the communication network 1902, carries out processing on the basis of the received information, and transmits a processing result to the terminal device 10A by the communication network 1902.

Furthermore, the processing server 1901 receives information from the communication device 20A by the communication network 1902, carries out processing on the basis of the received information, and transmits a processing result to the communication device 20A by the communication network 1902.

It should be noted that the communication network 1902 ought to be capable of data communication; however, the communication method is not particularly limited. For example, the communication network 1902 may be realized by various forms of communication networks such as a network including a fixed telephone line, a cellphone line, a satellite communication line, or a data communication line or the like, a metropolitan area network, an intra-company network, or a home network, or by a network or the like in which these are combined.

By adopting such a configuration, the communication device and the terminal device in the control system can cause part of the processing thereof to be carried out by the processing server. As a result of complex information processing and the like being carried out by the processing server, the processing quantity of the communication device or the terminal device can be lessened.

Figure 20:
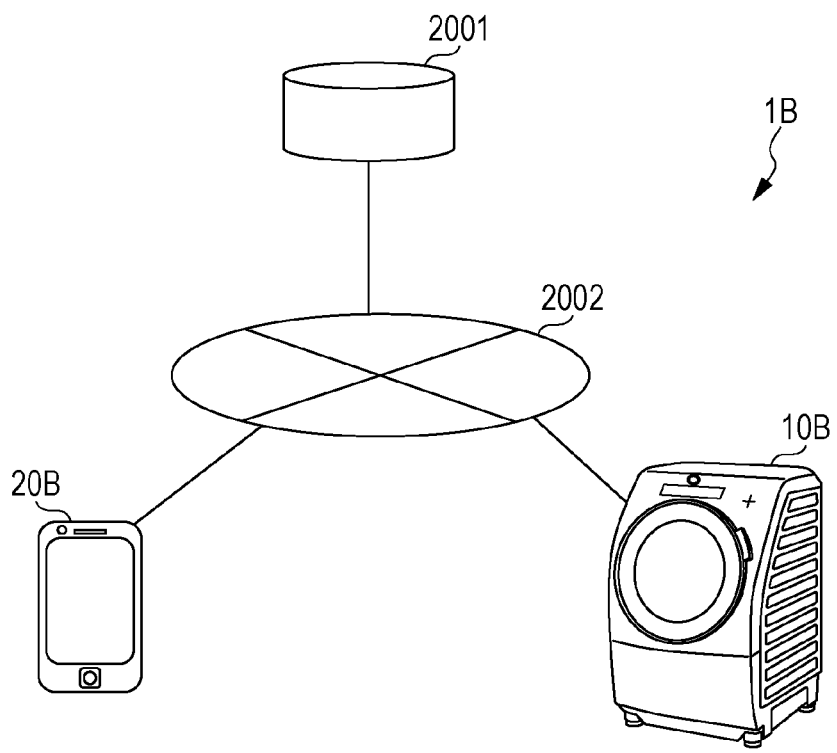
FIG. 20 is an illustrative diagram depicting a second modified example of a control system in the embodiments.

FIG. 20 is an illustrative diagram depicting a second modified example of a control system in the embodiments.

The control system 1B depicted in FIG. 20 is provided with a terminal device 10B, a communication device 20B, and an application server 2001. The terminal device 10B, the communication device 20B, and the application server 2001 are able to communicate with each other by a communication network 2002.

The terminal device 10B corresponds to the terminal devices 10, 11, 12, 13, and 14 in the embodiments; however, a program that carries out the processing thereof is acquired (downloaded) from the application server 2001. The terminal device 10B carries out processing by causing the program acquired from the application server 2001 to be executed.

The communication device 20B corresponds to the communication devices 20, 21, 22, 23, and 24 in the embodiments; however, a program that carries out the processing thereof is acquired (downloaded) from the application server 2001. The communication device 20B carries out processing by causing the program acquired from the application server 2001 to be executed.

It should be noted that the application server 2001 and the processing server 1901 may be realized as one device or may be realized as a plurality of devices.

It should be noted that the communication network 2002 may be the same as the communication network 1902.

Figure 21:
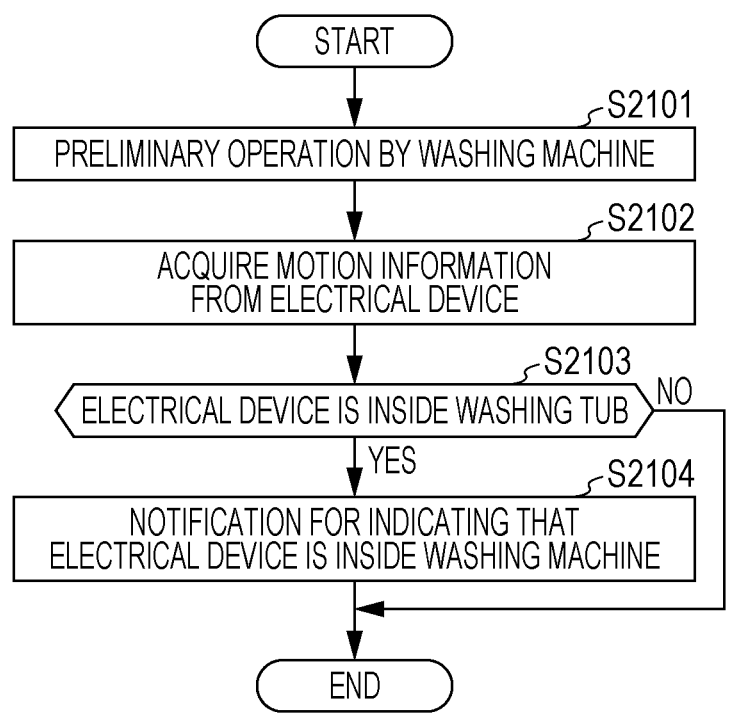
FIG. 21 is a flowchart depicting one form of a control method for a terminal device in the embodiments.

FIG. 21 is a flowchart depicting one form of a control method for a terminal device (washing machine) in the embodiments. The control method for a washing machine in the embodiments may be expressed as follows.

Specifically, the control method for a washing machine is a control method for a washing machine that is able to communicate with an electronic device by wireless communication, in which, as a preliminary operation by the washing machine, a washing tub of the washing machine is caused to operate (step S2101), motion information regarding the motion of the electronic device during the preliminary operation is acquired (step S2102), a determination as to whether or not the electronic device is inside the washing tub is carried out based on the acquired motion information and information indicating the operation of the washing tub (step S2103), and a notification for indicating that the electronic device is inside the washing tub is issued to the washing machine if it is determined in the determination that the electronic device is inside the washing tub (step S2104).

Figure 22:
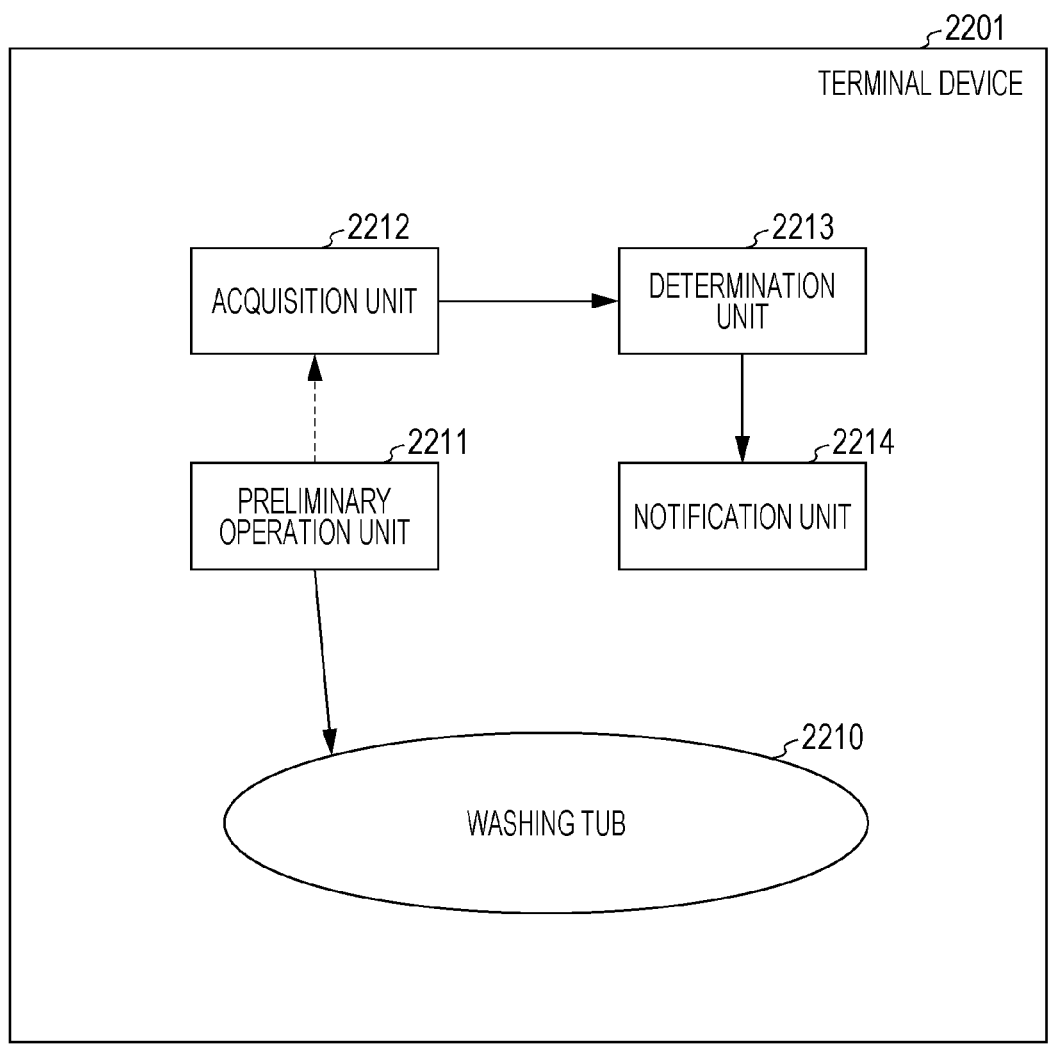
FIG. 22 is a configuration diagram of function blocks of one form of a terminal device in the embodiments.

FIG. 22 is a configuration diagram of function blocks of one form of a terminal device (washing machine) in the embodiments. The terminal device (washing machine) in the embodiments may be expressed as follows.

Specifically, the washing machine is a washing machine that is able to communicate with an electronic device by wireless communication, the washing machine including: a preliminary operation unit 2211 that, as a preliminary operation by the washing machine, causes a washing tub of the washing machine to operate; an acquisition unit 2212 that acquires motion information regarding the motion of the electronic device during the preliminary operation, from the electronic device by the wireless communication; a determination unit 2213 that carries out a determination as to whether or not the electronic device is inside the washing tub, based on the acquired motion information and information indicating the preliminary operation; and a notification unit 2214 that issues a notification for indicating that the electronic device is inside the washing tub, to the washing machine, if it is determined in the determination that the electronic device is inside the washing tub.

It should be noted that, in the aforementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes a control system and the like of the aforementioned embodiments is a program such as the following.

Specifically, this program is a control method for a washing machine that is able to communicate with an electronic device by wireless communication, in which, as a preliminary operation by the washing machine, a washing tub of the washing machine is caused to operate, motion information regarding the motion of the electronic device during the preliminary operation is acquired, a determination as to whether or not the electronic device is inside the washing tub is carried out based on the acquired motion information and information indicating the preliminary operation, and a notification for indicating that the electronic device is inside the washing tub is issued to the washing machine if it is determined in the determination that the electronic device is inside the washing tub.

A control system and the like according to one or more aspects have been described heretofore on the basis of the embodiments; however, the control system and the like are not limited to these embodiments. Modes in which various modifications conceived by a person skilled in the art have been implemented in the present embodiments, and modes constructed by combining the constituent elements in different embodiments may also be included within the scope of one or more aspects provided they do not depart from the purpose of the present disclosure.

A communication device or the like according to the present disclosure is able to detect being inside a terminal device on the basis of sensor information, and is thereby useful as a communication device that can stop the terminal device and cause the terminal device or the like to sound an alarm when the communication device is inside the terminal device.

What is claimed is:

1. A control method of a washing machine including a wireless communicator that communicates with an electronic device, the method comprising:
   storing, in advance, characteristic operation information indicating a motion pattern of a preliminary operation of the washing machine;
   causing the washing machine to operate a washing tub of the washing machine according to the motion pattern of the preliminary operation;
   acquiring motion information regarding a motion of the electronic device during the preliminary operation;
   determining whether or not the electronic device is inside the washing tub based on the acquired motion information and information indicating the motion pattern of the preliminary operation; and
   giving the washing machine a notification indicating that the electronic device is inside the washing tub, when it is determined that the electronic device is inside the washing tub,
   wherein the preliminary operation includes a rotational operation that causes the washing tub to rotate,
   the electronic device is provided with a sensor that detects a rotational motion of the electronic device, and
   rotational motion information obtained by the sensor regarding the rotational motion of the electronic device during the rotational operation is acquired as the motion information,
   the determining comprising:
   comparing the rotational motion information obtained by the sensor with the motion pattern of the preliminary operation; and determining whether or not the electronic device is inside the washing tub based on a result of the comparison between the obtained rotational motion information and the motion pattern of the preliminary operation,
wherein the rotational motion information includes acceleration or angular acceleration,
a weight of laundry inside the washing tub together with the electronic device is measured during the preliminary operation,
in the determining,
the measured weight is compared with a threshold,
the acceleration or angular acceleration is decreased when the measured weight is greater than the threshold, and
the decreased acceleration or angular acceleration is compared with the motion pattern of the preliminary operation.

2. The control method of a washing machine according to claim 1, further comprising:
prohibiting the washing machine from performing a main operation that is subsequent to the preliminary operation when the determining determines that the electronic device is inside the washing tub; and
allowing the washing machine to perform the main operation when the determining determines that the electronic device is not inside the washing tub.

3. The control method of a washing machine according to claim 1, wherein
detection of rotational motion by the sensor starts when the electronic device has received a detection start signal from the washing machine by the wireless communication.

4. The control method of a washing machine according to claim 1, wherein,
the motion pattern of the preliminary operation includes a first rotational operation at a first acceleration, and a second rotational operation at a second acceleration, following the first rotational motion, the first acceleration being different from the second acceleration, and
in the determining,
the rotational motion information obtained by the sensor is compared with the sequence of the first rotational operation and the second rotational operation with regard to the motion pattern of the preliminary operation, and
it is determined whether or not the electronic device is inside the washing tub, based on the result of the comparison between the sequence of the first rotational operation and the second rotational operation with regard to the motion pattern of the preliminary operation and the rotational motion information obtained by the sensor.

5. The control method of a washing machine according to claim 1, wherein
in the giving the notification, a user of the washing machine and the washing machine by the wireless communication are notified when the determining step determines that the electronic device is inside the washing tub.

6. The control method of a washing machine according to claim 2, wherein
the preliminary operation is an operation in which a liquid is not supplied into the washing tub, and
the main operation includes an operation in which the liquid is supplied into the washing tub.

7. The control method of a washing machine according to claim 6, wherein the preliminary operation is a weight measurement operation in which the washing tub rotates in order to measure a weight of laundry inside the washing tub together with the electronic device, and
the main operation is a washing operation in which the liquid is used to wash the laundry.

8. A washing machine including a wireless communicator that communicates with an electronic device, the washing machine comprising:
at least one memory that stores characteristic operation information indicating a motion pattern of a preliminary operation of the washing machine; and
circuitry operative to:
cause the washing machine to operate a washing tub of the washing machine according to the motion pattern of the preliminary operation;
acquire motion information regarding a motion of the electronic device during the preliminary operation;
determine whether or not the electronic device is inside the washing tub based on the acquired motion information and information indicating the motion pattern of the preliminary operation; and
give the washing machine a notification indicating that the electronic device is inside the washing tub, when it is determined that the electronic device is inside the washing tub,
wherein the preliminary operation includes a rotational operation that causes the washing tub to rotate,
the electronic device is provided with a sensor that detects a rotational motion of the electronic device, and
rotational motion information obtained by the sensor regarding the rotational motion of the electronic device during the rotational operation is acquired as the motion information,
the circuitry is operative to:
compare the rotational motion information obtained by the sensor with the motion pattern of the preliminary operation; and
determine whether or not the electronic device is inside the washing tub based on a result of the comparison between the obtained rotational motion information and the motion pattern of the preliminary operation,
wherein the rotational motion information includes acceleration or angular acceleration,
the circuitry is operative to:
measure a weight of laundry inside the washing tub together with the electronic device during the preliminary operation,
compare the measured weight with a threshold,
decrease the acceleration or angular acceleration when the measured weight is greater than the threshold, and
compare the decreased acceleration or angular acceleration with the motion pattern of the preliminary operation.

9. A non-transitory computer readable recording medium storing a program causing a computer to control a washing machine including a wireless communicator that communicates with an electronic device,
the program causing the computer to perform operations including:
causing the washing machine to operate a washing tub of the washing machine according to a motion pattern of a preliminary operation of the washing machine, the motion pattern of the preliminary operation being stored in advance as characteristic operation information;
acquiring motion information regarding a motion of the electronic device during the preliminary operation;

determining whether or not the electronic device is inside the washing tub based on the acquired motion information and information indicating the motion pattern of the preliminary operation; and giving the washing machine a notification indicating that the electronic device is inside the washing tub, when it is determined that the electronic device is inside the washing tub, wherein the preliminary operation includes a rotational operation that causes the washing tub to rotate, the electronic device is provided with a sensor that detects a rotational motion of the electronic device, and rotational motion information obtained by the sensor regarding the rotational motion of the electronic device during the rotational operation is acquired as the motion information, the determining comprising:

comparing the rotational motion information obtained by the sensor with the motion pattern of the preliminary operation: and determining whether or not the electronic device is inside the washing tub based on a result of the comparison between the obtained rotational motion information and the motion pattern of the preliminary operation, wherein the rotational motion information includes acceleration or angular acceleration, a weight of laundry inside the washing tub together with the electronic device is measured during the preliminary operation, in the determining, the measured weight is compared with a threshold, the acceleration or angular acceleration is decreased when the measured weight is greater than the threshold, and the decreased acceleration or angular acceleration is compared with the motion pattern of the preliminary operation.

10. The control method of a washing machine according to claim 1, wherein the motion pattern includes a time period of the rotational operation, and in the determining, the rotational motion information obtained by the sensor is compared with the motion pattern of the preliminary operation with respect to the time period.

11. The control method of a washing machine according to claim 10, wherein a motion other than the rotational motion is detected during the preliminary operation, and in the determining, the rotational motion information is modified by excluding the motion other than the rotational motion, and the modified rotational motion information, in which the motion other than the rotational motion is excluded, is compared with the motion pattern of the preliminary operation, with respect to the time period.

12. The control method of a washing machine according to claim 1, wherein a distance from a center of rotation of the washing tub to the electronic device is obtained, in the determining, the acceleration or angular acceleration is adjusted based on the obtained distance, and the adjusted acceleration or angular acceleration is compared with the motion pattern of the preliminary operation.

13. The control method of a washing machine according to claim 5, wherein the first rotational operation is in a direction opposite to the second rotational operation.

* * * * *